(12) United States Patent
Hammerschmidt et al.

(10) Patent No.: US 12,176,942 B2
(45) Date of Patent: *Dec. 24, 2024

(54) NEXT-GENERATION ULTRA-WIDEBAND FRAME FORMATS

(71) Applicant: Apple Inc., Cupertino, CA (US)

(72) Inventors: Joachim S. Hammerschmidt, Mountain View, CA (US); Ersen Ekrem, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,349

(22) Filed: Sep. 11, 2023

(65) Prior Publication Data

US 2024/0113742 A1 Apr. 4, 2024

Related U.S. Application Data

(63) Continuation of application No. 17/573,261, filed on Jan. 11, 2022, now Pat. No. 11,757,488, which is a continuation of application No. 17/160,688, filed on Jan. 28, 2021, now Pat. No. 11,239,881.

(60) Provisional application No. 62/968,937, filed on Jan. 31, 2020.

(51) Int. Cl.
*H04B 1/7163* (2011.01)
*H04B 1/719* (2011.01)

(52) U.S. Cl.
CPC ......... *H04B 1/71632* (2013.01); *H04B 1/719* (2013.01)

(58) Field of Classification Search
CPC .............. H04B 1/71632; H04B 1/719

USPC ................................................. 375/130, 267
See application file for complete search history.

(56) References Cited

U.S. PATENT DOCUMENTS

| 7,421,016 | B2 | 9/2008 | Fischel | |
|---|---|---|---|---|
| 10,763,958 | B2 | 9/2020 | Soto | |
| 11,757,488 | B2 * | 9/2023 | Hammerschmidt | ........................ H04W 52/028 375/329 |
| 2005/0018638 | A1 * | 1/2005 | Lindskog | .......... H04W 52/0296 370/338 |
| 2007/0086532 | A1 | 4/2007 | Ferchland | |
| 2008/0144493 | A1 | 6/2008 | Yeh | |
| 2009/0122736 | A1 | 5/2009 | Damnjanovic | |
| 2012/0077532 | A1 | 3/2012 | Kadous | |

(Continued)

*Primary Examiner* — Don N Vo

(74) *Attorney, Agent, or Firm* — Kowert, Hood, Munyon, Rankin & Goetzel, P.C.

(57) ABSTRACT

Methods, systems, and apparatuses are presented to transmit fragmented communication frames, such as fragmented ultra-wideband (UWB) frames. In some implementations, a communication frame may be divided into a plurality of fragments, and the fragments may be transmitted across a plurality of regulatory test intervals. E.g., each fragment may be transmitted within a mutually-exclusive regulatory test interval. In some implementations, each fragment may be constrained in time and/or transmission power, such that the total energy emitted during transmission of the fragment remains within a maximum energy limit defined for the regulatory test interval, e.g., by a regulatory entity. In some implementations, the sum of the energy emitted during transmission of two or more fragments may exceed the maximum energy limit defined for the regulatory test interval.

20 Claims, 22 Drawing Sheets

(56) References Cited

U.S. PATENT DOCUMENTS

| | | | |
|---|---|---|---|
| 2012/0256735 A1* | 10/2012 | Gilson | G08C 23/04 340/12.23 |
| 2014/0286280 A1 | 9/2014 | Seo | |
| 2014/0369321 A1* | 12/2014 | Tan | H04B 7/01 370/336 |
| 2017/0142751 A1 | 5/2017 | Liu | |
| 2018/0279227 A1* | 9/2018 | Kim | H04W 52/24 |
| 2019/0273636 A1 | 9/2019 | Batra | |

* cited by examiner

NEXT-GENERATION ULTRA-WIDEBAND FRAME FORMATS

PRIORITY CLAIM

This application is a continuation of U.S. patent application Ser. No. 17/573,261, titled "Next-Generation Ultra-Wideband Frame Formats", filed on Jan. 11, 2022, which is a continuation of U.S. patent application Ser. No. 17/160,688, titled "Next-Generation Ultra-Wideband Frame Formats", filed on Jan. 28, 2021, now U.S. Pat. No. 11,239,881, issued on Feb. 1, 2022, which claims benefit of priority of U.S. Provisional Application Ser. No. 62/968,937, titled "Next-Generation Ultra-Wideband Frame Formats", filed Jan. 31, 2020, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for transmitting wireless communication packets within regulatory emission limits.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Ultra-Wideband (UWB) is a wireless signaling framework recently gaining in popularity for use in wireless devices, e.g., for localization and positioning purposes through techniques such as Time-of-Flight (TOF) ranging measurements or Angle-of-Arrival (AoA) estimation. UWB is attractive for high-resolution positioning and localization purposes because it typically operates using large signaling bandwidths, e.g., 500 MHz or multiples thereof.

However, UWB typically operates under severe emissions constraints, as defined by regulations in various jurisdictions. These emissions constraints are often orders of magnitude below that of other license-free wireless systems, such as WLAN or Bluetooth. Constraining the power emitted when transmitting a given packet may limit the operating range or other parameters of UWB operation.

Accordingly, improvements in the field are desired.

SUMMARY

Embodiments are presented herein of, inter alia, systems, apparatuses, and methods for transmitting fragmented communication frames. In some implementations, a communication frame may be divided into a plurality of fragments, and each fragment may be transmitted, with the fragments spaced between silence intervals. In some implementations, each fragment may be constrained in time and/or transmission power, such that the total energy emitted during transmission of all fragments within a regulatory test interval remains within a maximum energy limit defined for the regulatory test interval, e.g., by a regulatory entity. In some implementations, the sum of the energy emitted during transmission of the complete communication frame may exceed the maximum energy limit defined for the regulatory test interval, but the frame may be spread across multiple regulatory test intervals, such that the maximum energy limit is satisfied for any interval equal to the regulatory test interval.

A wireless communication device is disclosed, comprising wireless communication circuitry and processor circuitry coupled to the wireless communication circuitry. The processor circuitry may cause the wireless communication device to transmit, via the wireless communication circuitry, a first fragment of the communication frame during a first time period, wherein the first time period is less than a predefined test interval, and wherein the energy emitted during transmission of the first fragment remains within a predetermined energy limit allowed for transmission within the predefined test interval. The wireless communication device may transmit a second fragment of the communication frame during a second time period, wherein the second time period is less than the predefined test interval, wherein the energy emitted during transmission of the second fragment remains within the predetermined energy limit, wherein the second time period is separated from the first time period by a silence time period, during which no portion of the communication frame is transmitted, and wherein the start of the second time period follows the start of the first time period by at least the duration of the predefined test interval.

In some scenarios, the sum of the energy emitted during transmission of the first fragment and the energy emitted during transmission of the second fragment may exceed the predetermined energy limit allowed for transmission within the predefined test interval.

In some scenarios, the predetermined energy limit allowed for transmission within the predefined test interval may be defined by government regulation.

In some scenarios, the processor circuitry may cause the wireless communication circuitry to transition to a low-power state upon completion of transmission of the first fragment of the communication frame; and cause the wireless communication circuitry to transition to an active state prior to transmitting the second fragment of the communication frame.

In some scenarios, the first fragment and the second fragment may be transmitted within a first frequency channel, and the predetermined energy limit allowed for transmission within the predefined test interval may pertain only to energy emitted within the first frequency channel. In such scenarios, the wireless communication device may transmit, within a second frequency channel, a fragment of a second communication frame during a third time period, wherein at least a portion of the first fragment of the communication frame and at least a portion of the fragment of the second communication frame fall within the duration of the predefined test interval, and wherein the sum of the energy emitted during transmission of the at least a portion of the first fragment and the energy emitted during transmission of the at least a portion of the fragment of the second communication frame exceeds the predetermined energy limit allowed for transmission within the predefined test interval.

In some scenarios, the wireless communication device may transmit a resynchronization sequence, after transmitting the first fragment but before transmitting the second sequence, wherein the resynchronization sequence comprises a known synchronization pattern.

In some scenarios, the second frame may not include a synchronization field. In some such scenarios, the first fragment may include a synchronization field, and the second fragment may include a scrambled timestamp sequence (STS) field.

A method is disclosed for transmitting a communication frame by a wireless communication device. The wireless communication device may divide the communication frame into a plurality of fragments, and may transmit each fragment of the plurality of fragments during a respective transmit time period, wherein each transmit time period after the initial transmit time period is separated from the preceding transmit time period by a silence time period, wherein transmission of the plurality of fragments is spread over a transmit interval that is longer than a predefined test interval. The wireless communication device may constrain the average transmit power used to transmit at least one of the fragments such that the total energy emitted by the wireless communication device during any continuous portion of the transmit interval that is equal to the predefined test interval remains within a predetermined energy limit allowed for transmission within the predefined test interval.

In some scenarios, the sum of the total energy emitted by the wireless communication device for transmission of the plurality of fragments may exceed the predetermined energy limit allowed for transmission within the predefined test interval.

In some scenarios, dividing the communication frame into a plurality of fragments may include dividing the communication frame along predefined boundaries between fields of the communication frame.

In some scenarios, the predetermined energy limit allowed for transmission within the predefined test interval may be defined by government regulation.

In some scenarios, the predetermined energy limit allowed for transmission within the predefined test interval may pertain only to energy emitted within a first frequency channel, at least a first fragment of the plurality of fragments may be transmitted within the first frequency channel, and at least a first fragment of a second communication frame may be transmitted within a second frequency channel, within a single predefined test interval. In such scenarios, the sum of the energy emitted by the wireless communication device for transmission of the first fragment of the plurality of fragments and the first fragment of the second communication frame may exceed the predetermined energy limit allowed for transmission within the predefined test interval within the first frequency channel.

In some scenarios, the predetermined energy limit allowed for transmission within the predefined test interval may pertain only to energy emitted within a first frequency channel, at least a first fragment of the plurality of fragments may be transmitted within the first frequency channel, and at least a second fragment of the plurality of fragments is transmitted within a second frequency channel, within a single predefined test interval. In such scenarios, the sum of the energy emitted by the wireless communication device for transmission of the first fragment and the second fragment may exceed the predetermined energy limit allowed for transmission within the predefined test interval.

In some scenarios, the wireless communication device may transmit a resynchronization sequence between transmitting a first fragment and a second fragment of the plurality of fragments. The resynchronization sequence may include a known synchronization pattern that was not part of the communication frame before dividing the communication frame.

In some scenarios, only the initial fragment of the plurality of fragments incudes a synchronization field.

Apparatuses are disclosed for implementing the above methods.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
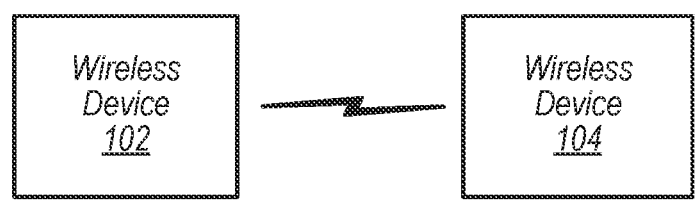
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Incorporation by Reference

Various details of example UWB communication protocols are disclosed in IEEE 802.15.4-2015, which is hereby incorporated by reference as though disclosed herein in its entirety.

Various details of example UWB communication protocols are disclosed in international draft specification IEEE 802.15.4a, which is hereby incorporated by reference as though disclosed herein in its entirety.

Various details of example UWB communication protocols are disclosed in IEEE 802.15.4z-2020, which is hereby incorporated by reference as though disclosed herein in its entirety.

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device. Other examples may include less mobile devices, such as desktop computers, entertainment centers, set-top boxes, climate control modules, security modules, smart home control modules, smart appliances, electronic doors/locks, vehicles, etc.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB" or "gNB") has the full breadth of its ordinary meaning, and at least includes a wireless communication station installed at a fixed location and used to communicate as part of a wireless cellular communication system.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including any of the wireless communication techniques disclosed herein, e.g., for data communication, ranging, and/or other purposes.

As one possibility, the first wireless device 102 and the second wireless device 104 may communicate using ultra-wideband (UWB) communication technology (e.g., IEEE 802.15.4 WPAN communication), Wi-Fi (e.g., IEEE 802.11), and/or other techniques based on WPAN or WLAN wireless communication. One or both of the wireless device 102 and the wireless device 104 may also be capable of communicating via one or more additional wireless communication protocols, such as any of Bluetooth (BT), Bluetooth Low Energy (BLE), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, a wireless locator tag, or virtually any type of mobile wireless device. As another possibility, one or more of the wireless devices 102, 104 may be a substantially stationary device, such as a set top box, media player (e.g., an audio or audiovisual device), gaming console, desktop computer, appliance, environmental controller, door lock, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards. For example, a device might be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more wireless communication techniques or features described subsequently herein with respect to FIGS. 4-22. By utilizing such techniques (and/or other techniques described herein), the wireless device(s) may (at least according to some embodiments) be able to achieve more efficient communication.

Figure 2:
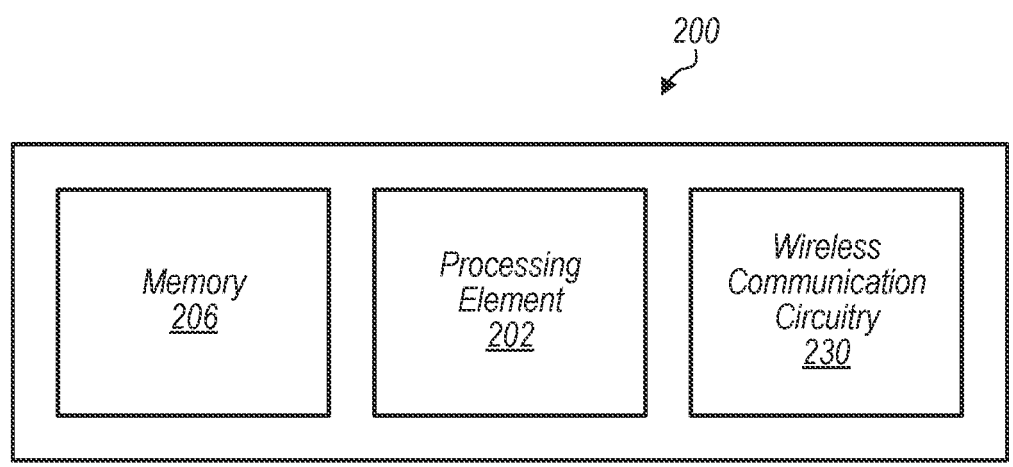
FIGS. 2-3 are block diagrams illustrating example wireless devices, according to various exemplary embodiments described herein.
Figure 3:
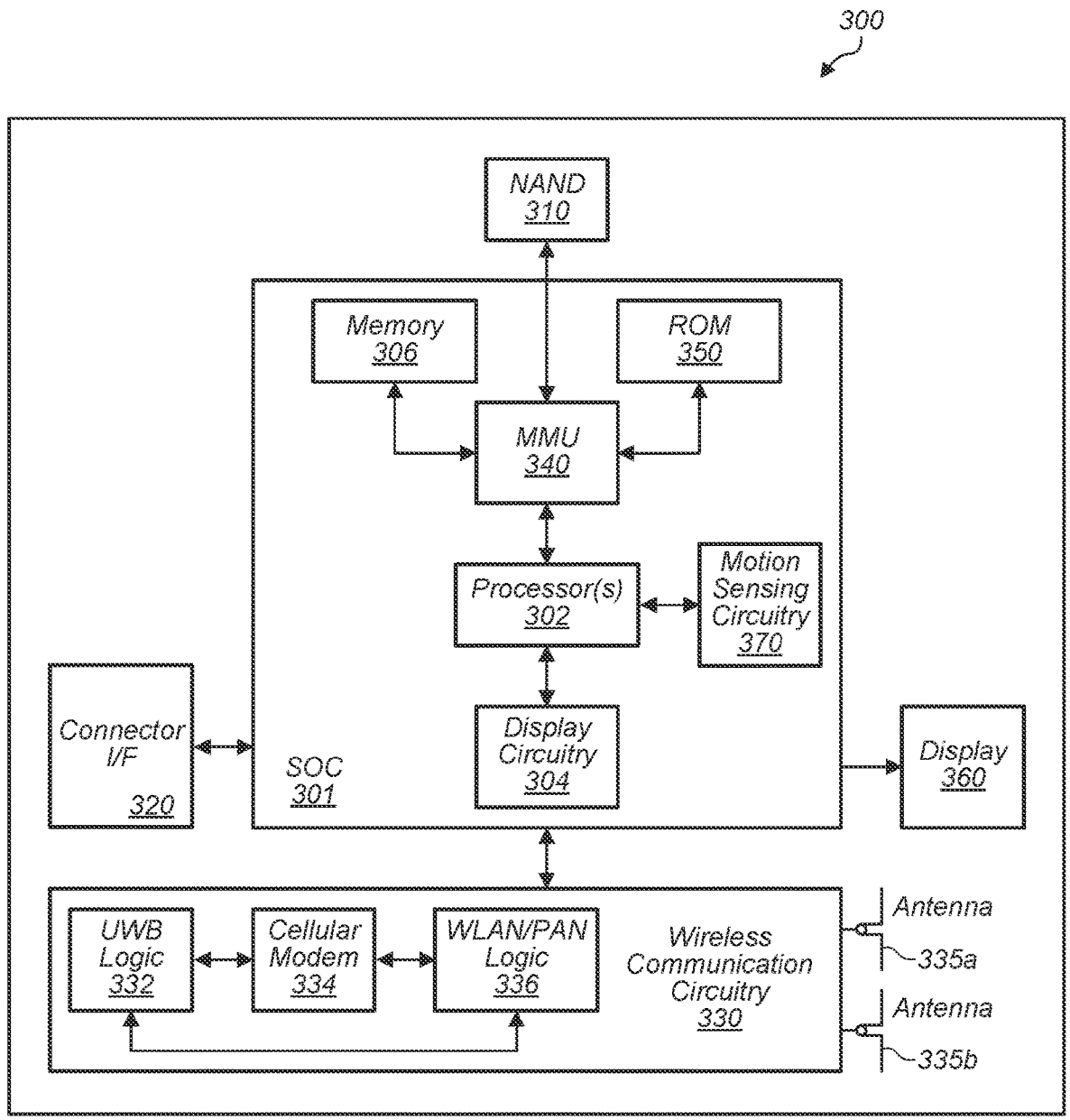

FIGS. 2-3—Exemplary Device Block Diagrams

FIG. 2 illustrates an exemplary wireless device 200 that may be configured for use in conjunction with various aspects of the present disclosure. For example, the device 200 may be an example of the wireless device 102 or the wireless device 104. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more of the techniques or features illustrated and/or described subsequently herein with respect to any or all of FIGS. 4-22.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be (or include) an 'application processor' whose primary function may be to support application layer operations in the device 200, while the wireless communication circuitry 230 might include a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including NAND flash 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments, multiple antennas 335*a* and 335*b*, for performing wireless communication with base stations and/or other devices. For example, the wireless device 300 may use antennas 335*a* and 335*b* to perform the wireless communication. As noted above, the wireless device 300 may in some embodiments be configured to communicate wirelessly using a plurality of wireless communication standards or radio access technologies (RATs).

The wireless communication circuitry 330 may include UWB Logic 332, a Cellular Modem 334, and additional WLAN/PAN Logic 336. The UWB Logic 332 is for enabling the wireless device 300 to perform UWB communications and/or ranging communications, e.g., according to 802.15.4 protocols. The WLAN/PAN Logic 336 is for enabling the wireless device 300 to perform other WLAN and/or PAN communications, such as Wi-Fi and/or Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., UWB Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

FIGS. 4-7—UWB Frame Formats

Ultra-Wideband (UWB) is a wireless signaling framework recently gaining in popularity, e.g., for localization and positioning purposes through techniques such as Time-of-Flight (TOF) ranging measurements or Angle-of-Arrival (AoA) estimation. UWB transceiver stations, such as the wireless device 300, may transmit UWB packets between each other with the aim to estimate the range (or distance) between them, or to estimate the angular direction under which the stations appear with respective to each other. Stations may also, or alternatively, transmit UWB packets to exchange payload data between each other. UWB operation typically uses large signaling bandwidths, e.g., 500 MHz or greater or multiples thereof, which makes UWB attractive for high-resolution positioning and localization purposes.

Figure 4:
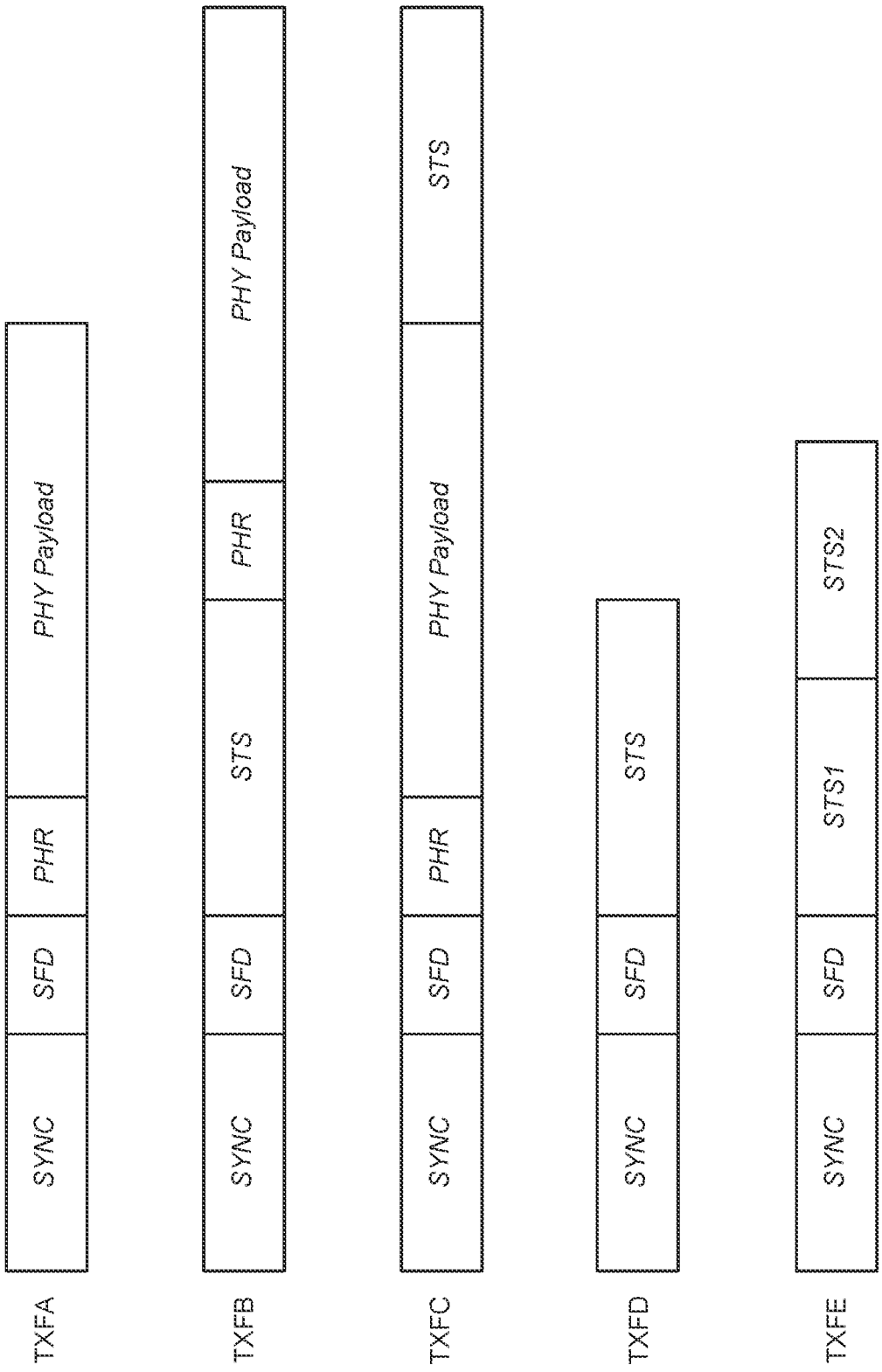
FIG. 4 illustrates example frame formats for use in UWB transmissions, according to some embodiments.

As with many other wireless communication systems (e.g., WLAN, Bluetooth, or Cellular Systems), UWB transmissions adhere to certain physical layer (PHY) frame formats, or packet formats (the terms "packet" and "frame" are used interchangeably herein). FIG. 4 illustrates example frame formats for use in UWB transmissions, according to some embodiments. Additional details regarding example frame formats may be found in international draft specification IEEE 802.15.4z "High Rate Phy (HRP)". FIG. 4 illustrates five example PHY frame formats (TXFA)-(TXFE). Frame format (TXFA) consists of 4 frame fields that are transmitted one after another: A synchronization (SYNC) sequence, a start of frame delimiter (SFD), a PHY Header (PHR), and a PHY Payload (or Data Payload). Frame format (TXFB) is similar to (TXFA), but has an additional frame field inserted between the SFD and the PHY: a Scrambled Timestamp Sequence (STS). Frame format (TXFC) is a variation of (TXFB) in that the STS is moved to the end of the frame. Frame format (TXFD) is a "No-Data" (ND) packet that contains a SYNC, SFD, and STS, but no PHR or Payload portions. Finally, frame format (TXFE) illustrates a frame format where the STS is split into multiple segments—two segments STS1 and STS2 in the ND example shown. The segmented STS can also be applied to frame formats (TXFA), (TXFB), and (TXFC).

The SYNC field, as illustrated in FIG. 4, may be used for synchronization and acquisition purposes. For, the SYNC field may be an a-priori known and periodic sequence, and may therefore be used to help the receiver detect the presence of an incoming packet (Packet Detection), adjust the radio gain (Automatic Gain Control, AGC), estimate the carrier frequency offset (CFO) and sample frequency offset (SFO) between the remote transmitter and the local receiver circuits, determine the timing synchronization, estimate the end-to-end propagation channel (Channel Impulse Response Estimation, CIR estimation), and/or perform other functions.

The SFD may be used to acquire the Frame Timing. The STS, if present, may allow performance of integrity-enhanced Channel Estimation and Time-Stamp validation for secure Time-of-Flight based range estimation. In the case of a packet bearing a Payload section, the PHR allows extraction of Payload signaling parameters such as the LENGTH of the packet (e.g., number of payload bytes), while the payload data itself may be contained in, and extracted by the receiver from, the Payload (or PHY Service Data Unit, PSDU).

Figure 5:
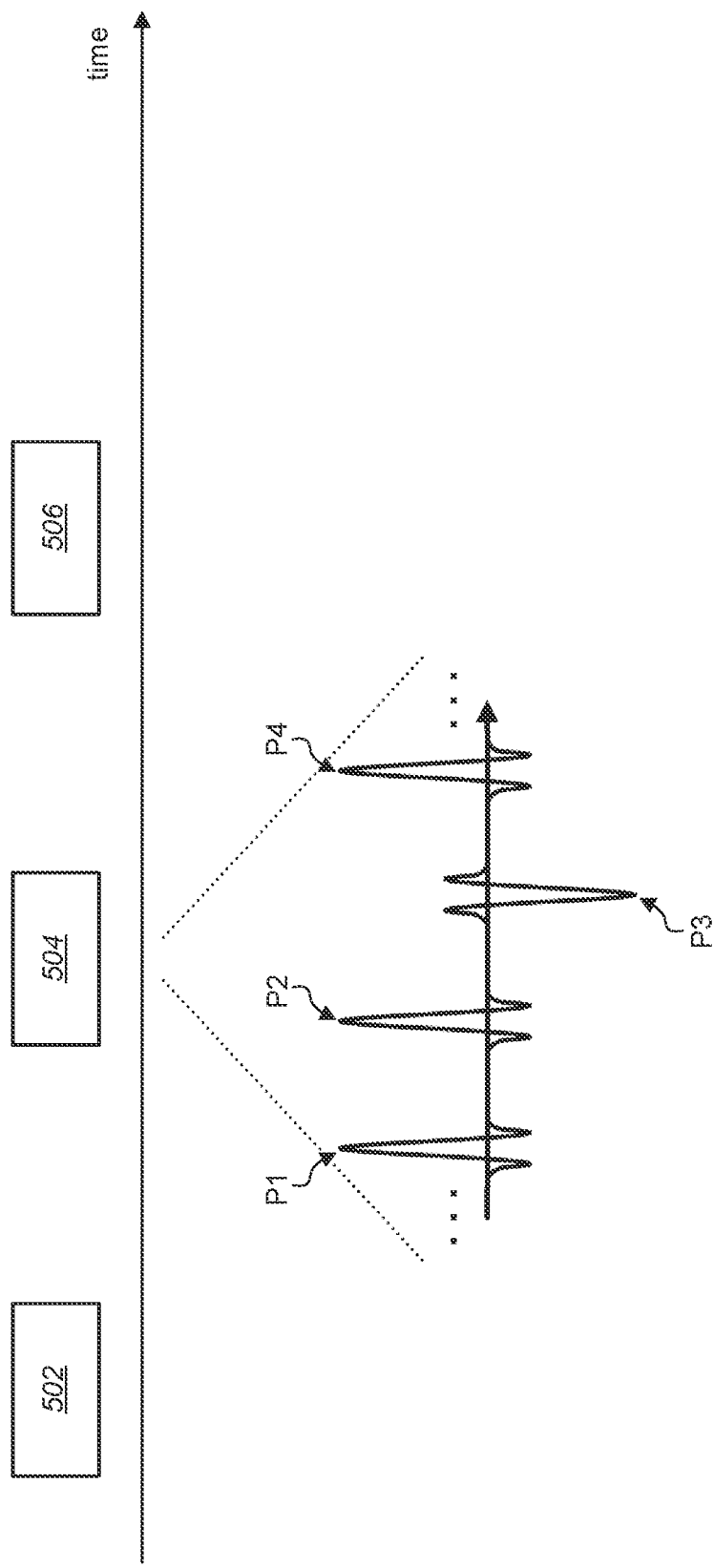
FIG. 5 illustrates an example sequence of UWB communications between two transceiver stations over time, according to some embodiments.

FIG. 5 illustrates a series of UWB communications between two transceiver stations, such as the wireless device 102 and the wireless device 104, according to some embodiments. For example, in some scenarios, communication 502 and communication 506 may each represent a PHY packet transmitted from the wireless device 102 to the wireless device 104, while communication 504 may represent a PHY packet transmitted from the wireless device 104 to the wireless device 102. UWB according to 802.15.4z HRP describes UWB transmissions as "Impulse Radio" (IR) transmissions, where each frame field consists of a large number of short pulses of roughly 2 ns duration, spaced by short silence periods. This is illustrated conceptually as the zoom-in view to packet 504 of FIG. 5. The zoom-in view shows a sequence of 4 pulses, P1, P2, P3, P4 of polarities+1, +1, −1, +1, respectively, that may be included in a long run of UWB pulses contained in packet 504. In one mode of 802.15.4z HRP, the average Pulse Density (or average pulse repetition frequency, PRF) may be in the order of approximately 62-63 MHz, so that one non-zero pulse occurs every 16 ns on average. In another mode, there may be a non-zero pulse every 8 ns on average (PRF of approximately 125 MHz). Also, some frame fields may have peak (instantaneous) pulse densities up to roughly 250 MHz or 500 MHz, so that non-zero pulses may be found right next to each other. Typical frame fields, e.g., as shown in FIG. 4, may have durations between roughly 8us (SFD) and tens of us (for example, Sync, STS), so that with the example PRF values discussed above, a typical frame may include many hundreds, if not many thousands, of non-zero pulses, and may span from a few dozen microseconds to hundreds of microseconds. The exact duration depends on the presence, or absence, of frame fields and the duration configuration for each frame field, as well as, if applicable, the length of the data payload. Additionally, in an earlier version of UWB IR according to IEEE 802.15.4a HRP, UWB frames spanning up to several milliseconds are defined.

The present disclosure is intended to supplement IEEE 802.15.4z UWB IR in HRP mode, as well as other UWB variants, such as Low-Rate-Phy (LRP), as well as other modes or embodiments.

UWB operation may use large signaling bandwidths of at least 500 MHz, and may operate in various bands below 10 GHz. It may be an "underlay" technology in that it allows concurrent license-free deployments in bands often assigned to licensed operation of non-UWB technology such as various commercial applications (e.g., point-to-point links) or radar and/or military uses. In order to prevent noticeable interference to the incumbent licensed deployments, the permissible electromagnetic emission levels (transmit power levels) emanating from UWB devices are mandated to be extremely low.

The details of allowed transmit powers/energies may depend on the respective frequency bands used, and may be defined by rules established by regulatory agencies (e.g., government entities) governing spectral use (such as the FCC in the US) in various regulatory domains/jurisdictions.

As one typical example, the transmit power levels permitted for UWB may be close to spurious emissions levels permitted for other wireless systems, such as far-out spectral mask levels of license-free operation of Wireless Local Area (WLAN) in the 2.4 or 5 GHz bands. The limit of UWB emission levels may be specified as a certain transmit power in units of dBm/MHz, and certain test procedures may be defined regarding how to measure these quantities. While different countries or regulatory domains/locales have different requirements and test procedures, a common value of the maximum emission level is −41.3 dBm/MHz, and this value may be measured over a 1 ms regulatory test interval with certain required settings in the test equipment (e.g., Spectrum Analyzer) utilized for the compliance test.

Figure 6:
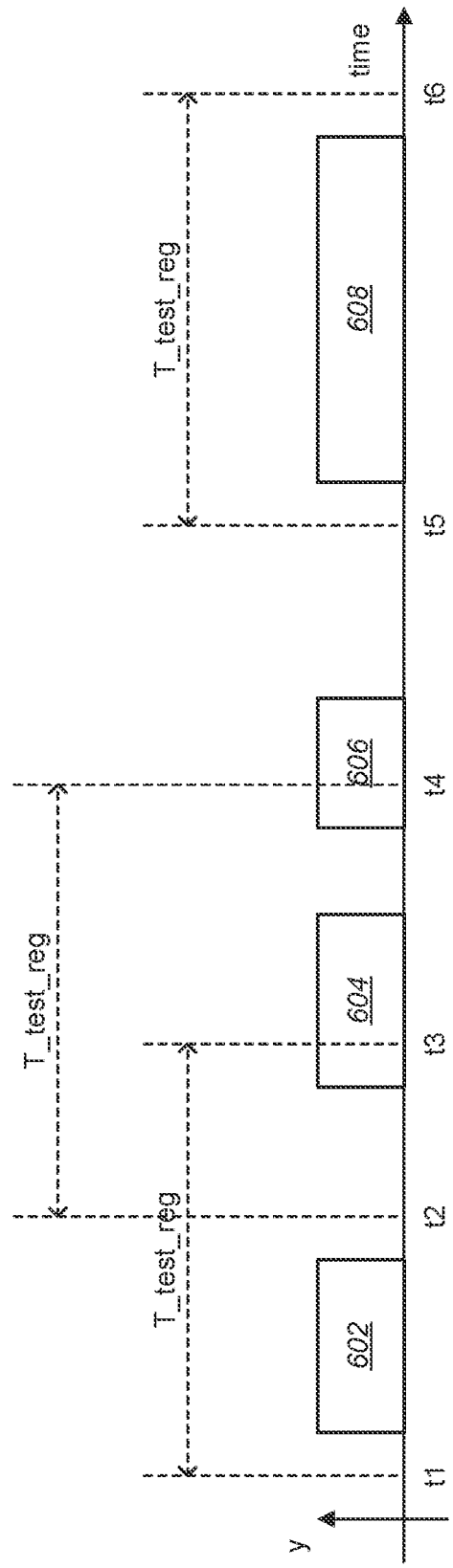
FIG. 6 illustrates an example sequence of transmitted packets over time, within examples of regulatory test intervals, according to some embodiments.

FIG. 6 illustrates an example sequence of transmitted packets 602-608 over time, along with three examples of the regulatory test interval T_test_reg, according to some embodiments. In some scenarios, one or more of the packets 602-608 may be, or include, a packet according to IEEE 802.15.4z, e.g., according to any of the examples illustrated in FIG. 4. During any time period of duration T_test_reg, the average emissions across the entire spectrum of the roughly 500 MHz wide signal must not exceed the maximum level defined by applicable regulations (e.g., −41.3 dBm/MHz). In other words, the sum of all emissions included in any portion of packets 602-608 falling within any interval of length T_test_reg must meet the regulatory requirement. FIG. 6 shows examples of where the test interval T_test_reg might fall, but any alignment of T_test_reg relative to the wireless traffic is possible and needs to meet the regulatory requirement. Note that other regulatory constraints may exist that limit the instantaneous, or peak, emissions in UWB signaling. In what follows, these peak rules are assumed to be satisfied.

The emissions levels under which UWB operates tend to be orders of magnitude below that of other license-free wireless systems; e.g., possibly 100 times, 1000 times, or even 10,000 times weaker than that of systems operating in dedicated license-free bands such as Industrial, Scientific, Medical (ISM) bands utilized for WLAN or Bluetooth operation.

These severely limited emissions levels for UWB pose a challenge to system developers. For example, for any wireless system, the permitted emission levels may be approximately proportional to the achievable "Link Budget", or to the maximum supported distance (or, operating range) and/or acceptable level of obstruction between communicating devices in the wireless channel. In this context, the Link Budget is defined as the ratio between the Transmit Power level emitted by the transmitter device over the Receiver Power level the receiver requires to perform the desired processing steps for an UWB system. The Link Budget, often expressed in the logarithmic domain in units of decibels (dB), captures the maximum permissible path loss due to square-low spreading of the transmitted energy as the distance increases, multi-path reflections and superposition effects causing signal fading, and obstruction (shadowing) phenomena, all of which are common for wireless systems in indoor and outdoor wireless propagation scenarios. The larger the Link Budget, the more resilient the system is to these artifacts, and reliable operation of the system can be guaranteed over larger distances. As the allowed transmit power levels relate directly to the available Link Budget, UWB, with its very small allowed emission levels, may be severely limited in its available Link Budget, and thus in its available operation range and resilience to strong shadowing and obstruction effects in the path between associated devices.

To mitigate this challenge to the permissible transmit power levels and associated Link Budget, UWB packet format definitions exist that span long time intervals, such that receivers can integrate (accumulate) signal energies over time to increase the usable signal-to-noise ratio (SNR) and perform signal detection tasks on the resulting accumulated wireless metrics. However, the operation of these long formats may not be efficient for small handheld and wearable devices, e.g., because the large bandwidth (500 MHz and beyond) may require substantial power consumption in transceiver circuits to operate fast Digital-to-Analog and Analog-to-Digital converters, Phase-Locked Loops, Power amplifiers (PAs), Low-Noise-Amplifiers (LNAs), filters, and other circuit elements, quickly draining small batteries.

Figure 7:
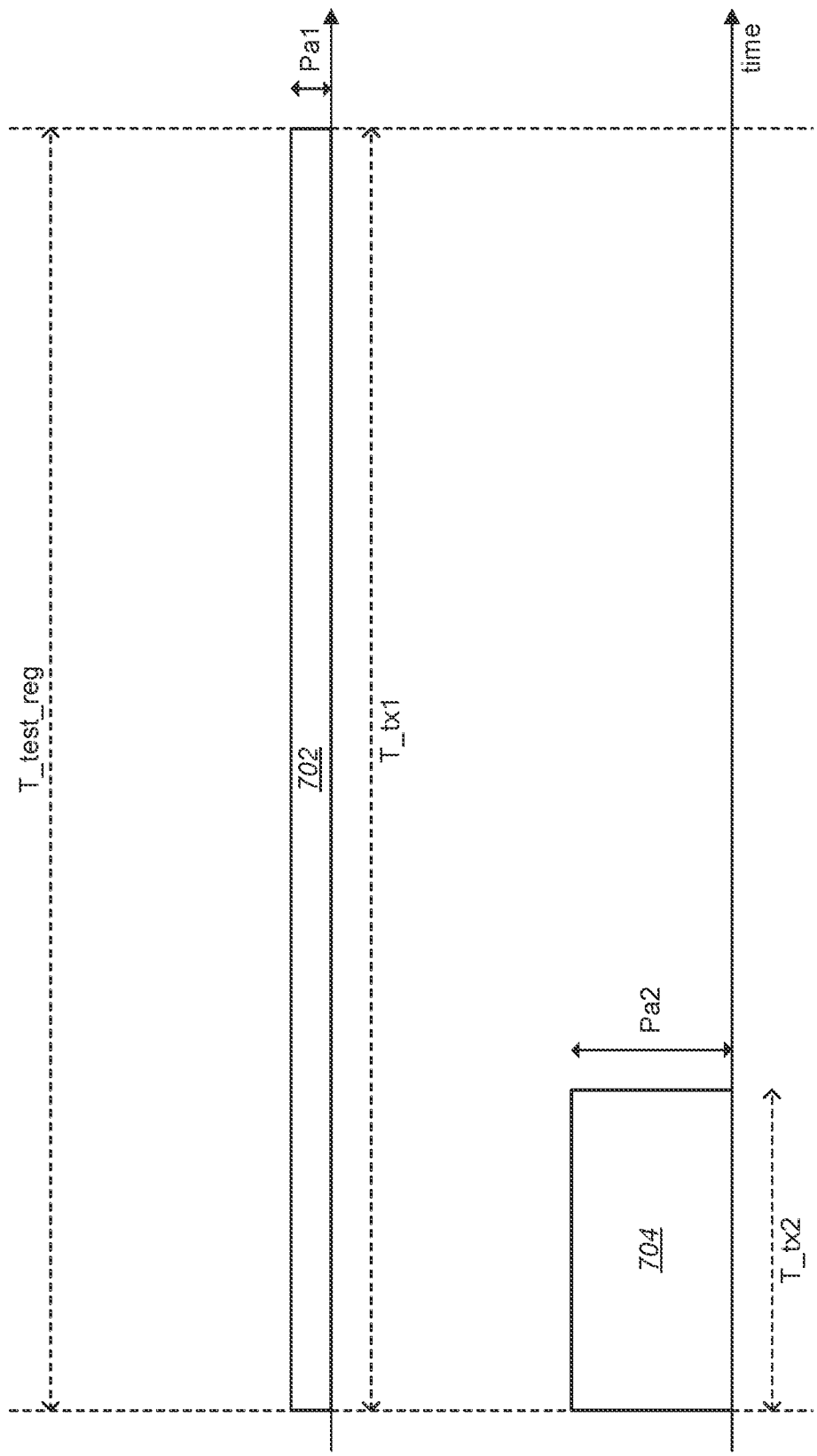
FIG. 7 illustrates two example transmission packets, each having a respective abstract packet format.

FIG. 7 illustrates two example transmission packets 702 and 704, each having a respective abstract packet format. Packet 702 has a format that extends over an entire regulatory test interval T_test_reg, such as 1 ms. Packet 702 extends over a temporal duration T_tx1, where T_tx1=T_test_reg. Packet 702 also exhibits a certain average transmit power Pa1 over its duration of active transmission, illustrated in FIG. 7 as the height of the box illustrating packet 702. Pa1 may be viewed as the average power level transmitted by the UWB transmitter in the course of transmitting packet 702. Note that in practice, the instantaneous power level, as measured over nanosecond or microsecond intervals, may vary in the course of T_tx1, as UWB IR uses a mix of non-zero pulses and brief silence periods and the local density of non-zero pulses may not necessarily be constant, as explained earlier.

The duration T_tx1 and the average power level Pa1 together can be used to calculate the emitted energy (E_tx1) during transmission of packet 702, which may be given by E_tx1=T_tx1*Pa1, where T_tx1 is in units of seconds, Pa1 in units of Watts, and E is in unit of Joules. Thus, the emitted energy E_tx1 is illustrated in FIG. 7 as the area of the packet 702. Under certain assumptions of suitably-chosen properties of the UWB packet, the regulatory rules on the maximum allowed emission levels may be interpreted as permitting transmissions containing up to a certain amount of energy E_reg over the regulatory test interval T_test_reg. For example, for a 500 MHz wide signal, allowed emission level of −41.3 dBm/MHz, and T_test_reg=1 ms, the best-case utilization of the permitted emissions (E_reg) may allow for the emitted energy to amount to approximately E_reg=37 nJ. If E_tx1 were equal to, or close to, E_reg, it can be said that format TXF1 operates at, or close to, the regulatory limit, which may be characterized as maximizing the available Link Budget.

As illustrated in FIG. 7, packet 704 has a different packet format that also operates at, or close to, the same energy limit of E_reg. Packet 704 extends over a temporal duration T_tx2, and has an average power level Pa2. As illustrated, the duration T_tx2 may be substantially shorter than the regulatory test interval T_test_reg. However, average power level Pa2 may be substantially larger than Pa1. As a result, the emitted energy (E_tx2) during transmission of packet 704, which may be given by E_tx2=T_tx2*Pa2 (and which may be illustrated in FIG. 7 as the area of the packet 704) may, in some scenarios, be similar to E_tx1. Note the number and distribution of non-zero UWB pulses in packet 704 may be chosen such that no peak emissions violations happen anywhere in the shorter interval T_tx2. Under the packet formats defined in IEEE 802.15.4z, the packet duration is limited to a fraction of the regulatory test interval, so typical implementations according to that standard may resemble packet 704 more closely that packet 702.

In a simple model of duration and average transmit power capturing the regulatory constraints, it can be stated that compliance with the regulatory emissions levels may be achieved by either packet 702 or 704, as long as $E\_tx1<E\_reg$ and $E\_tx2<E\_reg$. It may be noted that there are certain limits to reducing the air time in a given regulatory interval, as ultimately peak emission rules may be violated. Whether peak emission rules will be met or not will depend on many factors including pulse shaping, number and density of pulses (PRF), and others. Here, for simplicity of the description, the assumption is that no peak rules are violated.

In order to improve (e.g., maximize) the Link Budget, conventional UWB formats under previous IEEE specifications such as 802.15.4a may allow a transmission packet to span multiple regulatory test intervals. For example, in a particular scenario, three intervals may be used, each of which provides for an energy budget of $E\_reg$. Thus, a total of $3*E\_reg$ is available for the transmission. As noted earlier, one disadvantage of such a long transmission is that all circuitry on the transmit and receive devices in a given UWB link need to be run for extended time intervals. Furthermore, when the available energy per regulatory test interval is stretched over the entire interval, the effective signal-to-noise-ratios (SNRs) on the receive side tend to be long, further complicating the processing to make best use of the available received waveform and to achieve an optimum in Link Budget and receive performance. Additionally, in some implementations, an UWB radio may share one or more antenna(s) and/or other components with a radio operating according to another RAT, such as WLAN. In such implementations, extended UWB transmissions may interfere with communications scheduling for the other RAT.

Although the present detailed description is framed in the context of UWB transmissions, it should be understood that the principles disclosed herein may be similarly applied to any other protocols or RATs having applicable characteristics and constraints, such as maximum emissions limits within given time windows.

Figure 8:
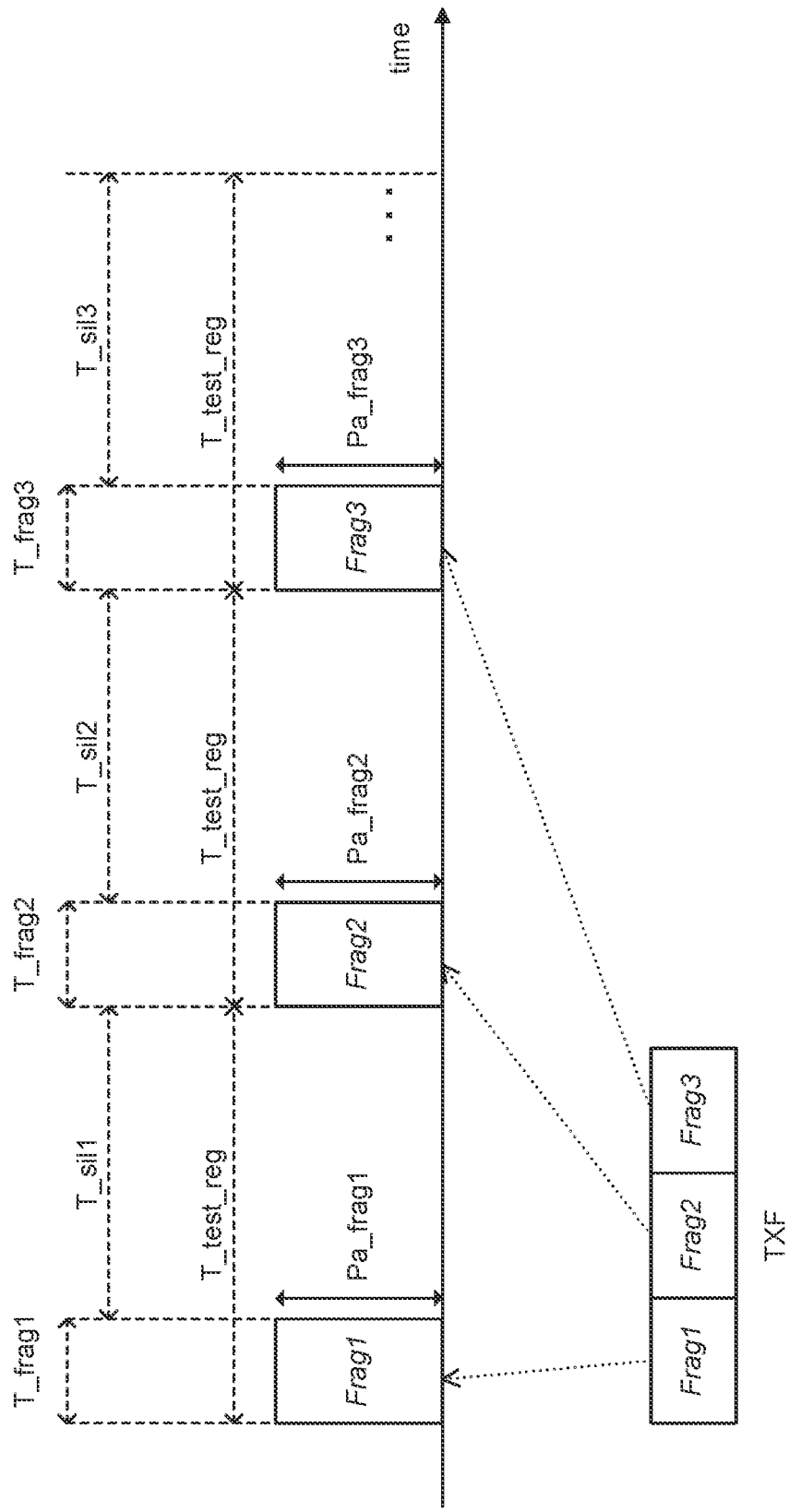
FIG. 8 illustrates a transmit frame being transmitted as a plurality of fragments distributed across a plurality of regulatory test intervals, according to some embodiments.
Figure 9:
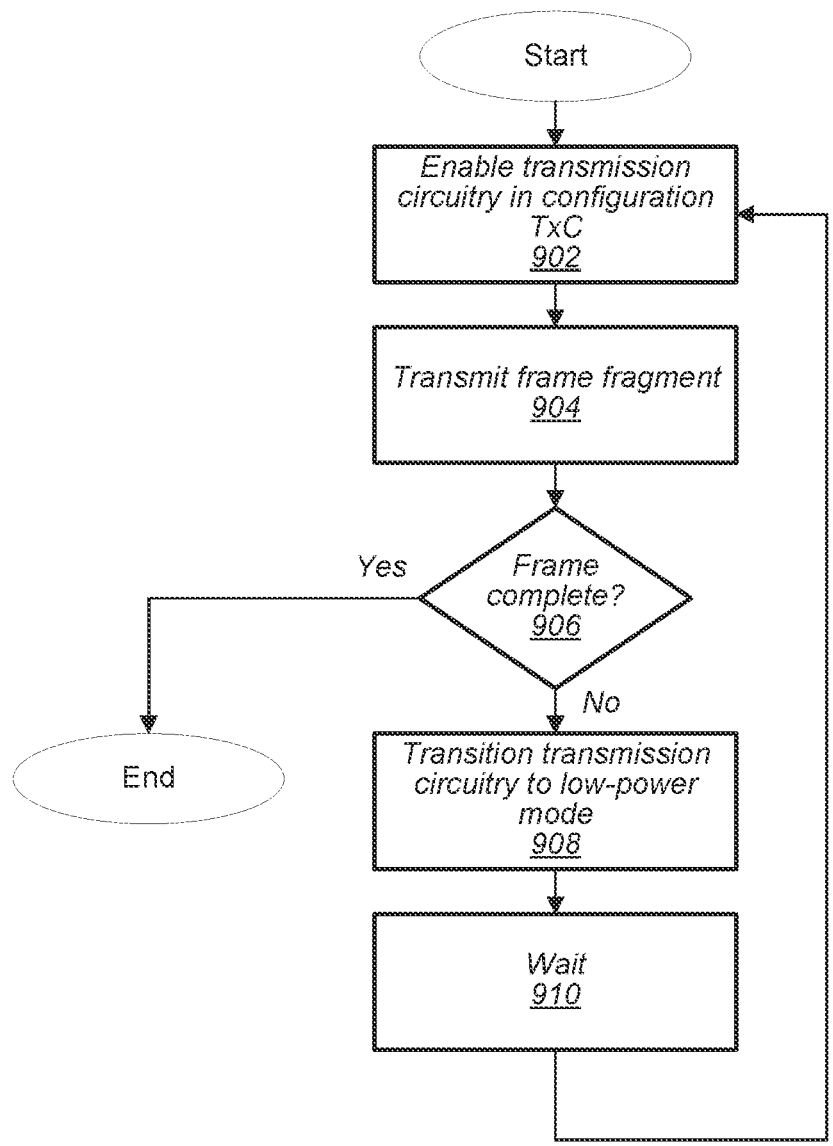
FIG. 9 is a flow chart illustrating an exemplary method for transmitting a fragmented communication frame, according to some embodiments.
Figure 10:
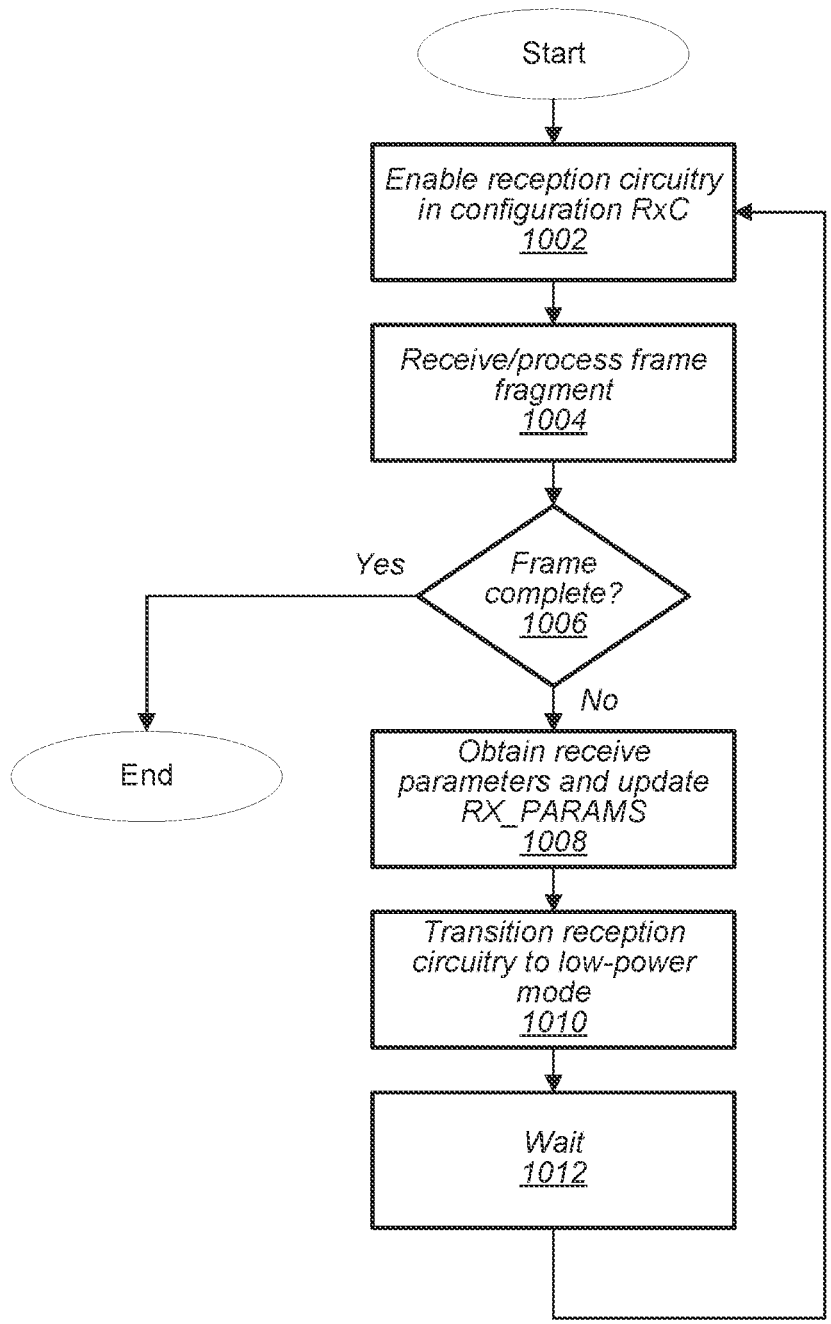
FIG. 10 is a flow chart illustrating an exemplary method for receiving a fragmented communication frame, according to some embodiments.

FIGS. 8-10—UWB Frame Fragmentation

To obtain the benefits of distributing a transmission packet across multiple regulatory test intervals, while avoiding the drawbacks noted above, a packet may be separated into fragments, which may then be distributed over multiple regulatory intervals. FIG. 8 illustrates a physical layer transmit frame (TXF) being transmitted as three fragments distributed across three regulatory test intervals in this manner, according to some embodiments. As illustrated, the frame TXF may be divided into three fragments, frag1, frag2, frag3. Each fragment may be transmitted with a respective time duration (T_frag1, T_frag2, or T_frag3, respectively) and a respective average power level (Pa_frag1, Pa_frag2, or Pa_frag3, respectively). Note that any number of fragments may be possible, although FIG. 8 illustrates the example of three fragments. In some implementations, the fragmentation may be performed at the physical layer (PHY), and each fragment may be encapsulated and transmitted as a respective PHY protocol data unit (PPDU).

Each fragment may be transmitted within a respective regulatory test interval. Each regulatory test interval may include a transmission period, during which the respective fragment may be transmitted, and a silence period (T_sil1, T_sil2, or T_sil3, respectively), during which no portion of the frame TXF is transmitted. In such an example, the energy of three regulatory intervals ($3*E\_reg$) is available for the overall transmission. To take advantage of the available energy budget of the multiple regulatory intervals, the respective time durations and average power levels of the fragments may be selected such that the emitted energy level of each fragment remains within the regulatory energy limit, $E\_reg$, but the sum of the fragments (or of two or more of the fragments) does exceed $E\_reg$. More specifically, in the best case, each fragment is transmitted with emitted energy at (or near) $E\_reg$. For example, in the best case the emitted energy of fragment 1 may be defined as $E\_frag1=T\_frag1*Pa\_frag1\approx E\_reg$.

In some scenarios, the transmitter may select (e.g., determine, define, choose from a table, etc.) the time duration and/or the average power of a fragment so as to constrain the emitted energy level of the fragment to remain within (e.g., not exceed) $E\_reg$. In some scenarios, the transmitter may select the time duration and/or the average power of a fragment so as to approach as close as possible (or as close as feasible) to $E\_reg$ without exceeding $E\_reg$. For example, in some scenarios, a maximum average power level may be determined, e.g., based on regulatory instantaneous transmission power limits, and a time duration of a fragment may then be selected so as to cause the total emitted energy level of the fragment to approach $E\_reg$ while operating at the determined average power level. In other scenarios, the time duration of a fragment may be predetermined, and the transmitter may determine an average power level for transmission of the fragment, e.g., so as to cause the total emitted energy level of the fragment to approach $E\_reg$.

An advantage of splitting a given physical layer transmit frame into several pieces is that, while the full regulatory energy budget can be utilized, much (e.g., most) of the transmit and receive circuitry may be operational during only the active periods T_frag1, T_frag2, and T_frag3, and may be placed into a low-energy state (e.g., minimized, deactivated, turned off, put to sleep, etc.) during the silence periods between transmission of the fragments. This may save current consumption from the battery. Another substantial benefit of the short fragments, as compared to a long format spanning the entirety of multiple regulatory test intervals, is that the transmit energy per fragment is transmitted quickly, giving rise to a higher SNR at the receive device. A higher instantaneous SNR may make a variety of reception and estimation tasks easier, such as extraction of CFO of SFO estimates or quick and low-complexity channel impulse response (CIR) estimation.

Example operations of transmitter and receiver devices utilizing this fragmentation concept are illustrated in FIG. 9 and FIG. 10.

FIG. 9 is a flow chart illustrating an exemplary method for transmitting a fragmented physical layer communication frame, such as an UWB frame, according to some embodiments. In various embodiments, the method illustrated in FIG. 9 may be performed by a wireless device, such as the wireless device 102, acting as a transmitter; or by one or more components thereof, such as the wireless communication circuitry 330 or the UWB Logic 332. As shown, the method may operate as follows.

At 902, the transmitter may configure applicable transmission circuitry (e.g., the UWB Logic 332 or some subset thereof) according to a particular transmit configuration (TxC). In some scenarios, configuring the transmission circuitry may include transitioning some or all of the transmission circuitry from a low-power state to an active state, in which the transmission circuitry is prepared (e.g., configured, enabled, etc.) to perform transmission. In some scenarios, TxC may include a desired carrier frequency, such as one of various 500 MHz channels defined in IEEE. Additionally, or alternatively, TxC may include certain parameters relating to transmit pulse shapes, transmit signaling scaling, sample rates, or other parameters.

At 904, the transmitter may transmit a first fragment of a frame (e.g., fragment 1). The transmitter may determine how to fragment the frame in any appropriate manner, such as according to any of the examples or explanations provided herein.

At 906, following transmission of the fragment, the transmitter may determine whether transmission of the entire frame is complete. E.g., the transmitter may determine whether the fragment just transmitted was the last fragment of the frame, or may otherwise determine whether all fragments have been transmitted.

If the transmitter determines, at 906, that transmission of the entire frame is not complete, then the transmitter may, at 908, transition the transmission circuitry, or some portion thereof, to a low-power mode. For instance, various transmit filters or amplifiers may be disabled, portions or all of the Phase Locked Loop/Local Oscillator modules may be powered down, and/or corresponding digital signal processing may be put on hold, e.g., by powering down supply voltages or by using clock gating approaches. In some scenarios, timekeeping circuitry (e.g., a Crystal Oscillator, XO) may remain running in order to maintain the time reference, so that subsequent fragments can be transmitted at suitable intervals in the future.

At 910, the transmitter may wait for a predetermined time period. The time period may be known to both the transmitter and a remote wireless device acting as a receiver. In some scenarios, the time period may be equal to one regulatory test interval from the time at which transmission of the current fragment began at 904. In some scenarios, the time period may be longer than one regulatory test interval from the start of transmission of the fragment.

After waiting for the predetermined time period, the transmitter may return to 902, to configure the transmission circuitry according to TxC. As noted above, configuring the transmission circuitry may include transitioning the transmission circuitry from the low-power state to an active state, in which the transmission circuitry is again prepared to perform transmission. The transmitter may then transmit (at 904) the next fragment of the frame, and determine (at 906) whether transmission of the entire frame is complete. This cycle may continue, allowing transmission of any number of fragments, until the transmitter determines, at 906, that transmission of the entire frame is complete.

If the transmitter determines, at 906, that transmission of the entire frame is complete, then the transmitter may end the method. In some scenarios, this may include steps such as beginning transmission of a new frame; transitioning the transmission circuitry to a low-power mode, similar to that of 908; transitioning to a deeper low-power mode, e.g., up to or including fully powering down the wireless communication circuitry; surrendering control of the wireless medium; etc.

It should be understood that the method of FIG. 9 is one example of a method for transmitting a fragmented communication frame, and other examples are also envisioned. For example, in various embodiments, some of the elements of the method shown may be performed concurrently, in a different order than shown, may be substituted for by other method elements, or may be omitted. Additional method elements may also be performed as desired. As a specific example, in some scenarios, the transmitter may determine (at 906) whether transmission of the entire frame is complete at a time following 908 or 910, rather than at the position shown.

FIG. 10 is a flow chart illustrating an exemplary method for receiving a fragmented physical layer communication frame, such as an UWB frame, according to some embodiments. In some scenarios, the method illustrated in FIG. 10 may allow for receiving a fragmented physical layer communication frame transmitted according to the method illustrated in FIG. 9. In various embodiments, the method illustrated in FIG. 10 may be performed by a wireless device, such as the wireless device 104, acting as a receiver; or by one or more components thereof, such as the wireless communication circuitry 330 or the UWB Logic 332. As shown, the method may operate as follows.

At 1002, the receiver may configure applicable reception circuitry (e.g., the UWB Logic 332 or some subset thereof) according to a particular receive configuration (RxC). In some scenarios, configuring the reception circuitry may include transitioning some or all of the reception circuitry from a low-power state to an active state, in which the reception circuitry is prepared (e.g., configured, enabled, etc.) to perform reception and processing of a communication signal. In some scenarios, RxC may include a desired carrier frequency, such as one of various 500 MHz channels defined in IEEE. Additionally, or alternatively, RxC may include certain parameters relating to pulse shapes, signaling scaling, sample rates, or other parameters.

At 1004, the receiver may receive and process a first fragment of a frame (e.g., fragment 1).

At 1006, following reception of the fragment, the receiver may determine whether reception of the entire frame is complete. E.g., the receiver may determine whether the fragment just received was the last fragment of the frame, or may otherwise determine whether all fragments have been received. In some scenarios, the receiver may know in advance the number of fragments to be received in the frame.

If the receiver determines, at 1006, that reception of the entire frame is not complete, then the receiver may, at 1010, transition the reception circuitry, or some portion thereof, to a low-power mode, e.g., in a manner similar to that described for the transmission circuitry in connection with FIG. 9. For instance, various receive filters or amplifiers may be disabled, portions or all of the Phase Locked Loop/Local Oscillator modules may be powered down, and/or corresponding digital signal processing may be put on hold, e.g., by powering down supply voltages or by using clock gating approaches. In some scenarios, timekeeping circuitry (e.g., a Crystal Oscillator, XO) may remain running in order to maintain the time reference, so that subsequent fragments can be received at suitable intervals in the future.

At 1012, the receiver may wait for a predetermined time period. As noted above, the time period may be known to both the receiver and the transmitter. In some scenarios, the time period may be equal to one regulatory test interval from the time at which reception of the current fragment began at 1004 (or slightly less). In some scenarios, the time period may be longer than one regulatory test interval from the start of reception of the fragment.

After waiting for the predetermined time period, the receiver may return to 1002, to configure the reception circuitry according to RxC. As noted above, configuring the reception circuitry may include transitioning the reception circuitry from the low-power state to an active state, in which the reception circuitry is again prepared to perform reception. The receiver may then receive (at 1004) the next fragment of the frame, and determine (at 1006) whether reception of the entire frame is complete. This cycle may continue, allowing reception of any number of fragments, until the receiver determines, at 1006, that reception of the entire frame is complete.

If the receiver determines, at 1006, that reception of the entire frame is complete, then the receiver may end the method. In some scenarios, this may include steps such as beginning reception of a new frame; transitioning the reception circuitry to a low-power mode, similar to that of 1010; etc.

In some scenarios, the receiver may, in the course of receiving a fragment, determine preferred (e.g., optimal) receive parameters for receiving the signal. Such parameters may include signal information, receiver settings, etc. for use in receiving the incoming signal. For example, such receive parameters may include a preferred (e.g., optimal) gain stage setting or other stat information determined by an automatic gain control (AGC) circuit of the receiver. Other examples may include CFO and/or SFO estimates, or CIR channel estimates.

Determining these parameters independently for each fragment received may be inefficient. However, it may be observed that end-to-end system behavior, including propagation channel properties such as multipath reflections or crystal oscillation frequencies at the transmitter and the receiver, are unlikely to change over short intervals such as T_test_reg. Therefore, in some scenarios, the receiver may, at 1008, obtain one or more parameters determined and/or used during reception of the most recent fragment, and may store the one or more parameters as a set of values RX_PARAMS. Thereafter, at the next iteration of 1002, the receiver may configure the reception circuitry according to RxC, and further according to RX_PARAMS. Thus, the receiver may begin reception of the next fragment using the information, settings, etc. stored as RX_PARAMS. In some scenarios, the receiver may receive each subsequent fragment of a frame (i.e., the remainder of the present frame) utilizing RX_PARAMS as determined during reception of the first fragment of the frame. In some scenarios, RX_PARAMS may be updated or refined following reception of a subsequent fragment (e.g., following reception of each fragment) of the frame, at subsequent iterations of 1008.

In some scenarios, RX_PARAMS may be stored in explicit memory locations such as in conventional RAM. In some scenarios, it may be more implicitly stored in registers that are part of receiver logic, where state information may be easily preserved from fragment to fragment.

It should be understood that the method of FIG. 10 is one example of a method for receiving a fragmented communication frame, and other examples are also envisioned. For example, in various embodiments, some of the elements of the method shown may be performed concurrently, in a different order than shown, may be substituted for by other method elements, or may be omitted. Additional method elements may also be performed as desired. As a specific example, in some scenarios, obtaining and storing RX_PARAMS (at 1008) may be omitted. As another example, the receiver may determine (at 1006) whether reception of the entire frame is complete at a time following 1008, 1010, or 1012, rather than at the position shown.

FIGS. 11-23—Example Fragmentation Implementations

In some implementations, the physical layer frame fragments as illustrated in FIG. 8 (e.g., frag1, frag2, and frag3) may correspond to one or more UWB PHY frame fields, such as those illustrated in FIG. 4; e.g., SYNC, SFD, STS, PHR, and/or Payload. In some scenarios, a single frame field may be segmented into a plurality of fragments for transmission. A variety of practical fragmentation examples are illustrated in FIGS. 11-22. It should be understood that these are specific examples, while the present disclosure is intended to encompass combinations of the examples shown, as well as other variations.

Figure 11:
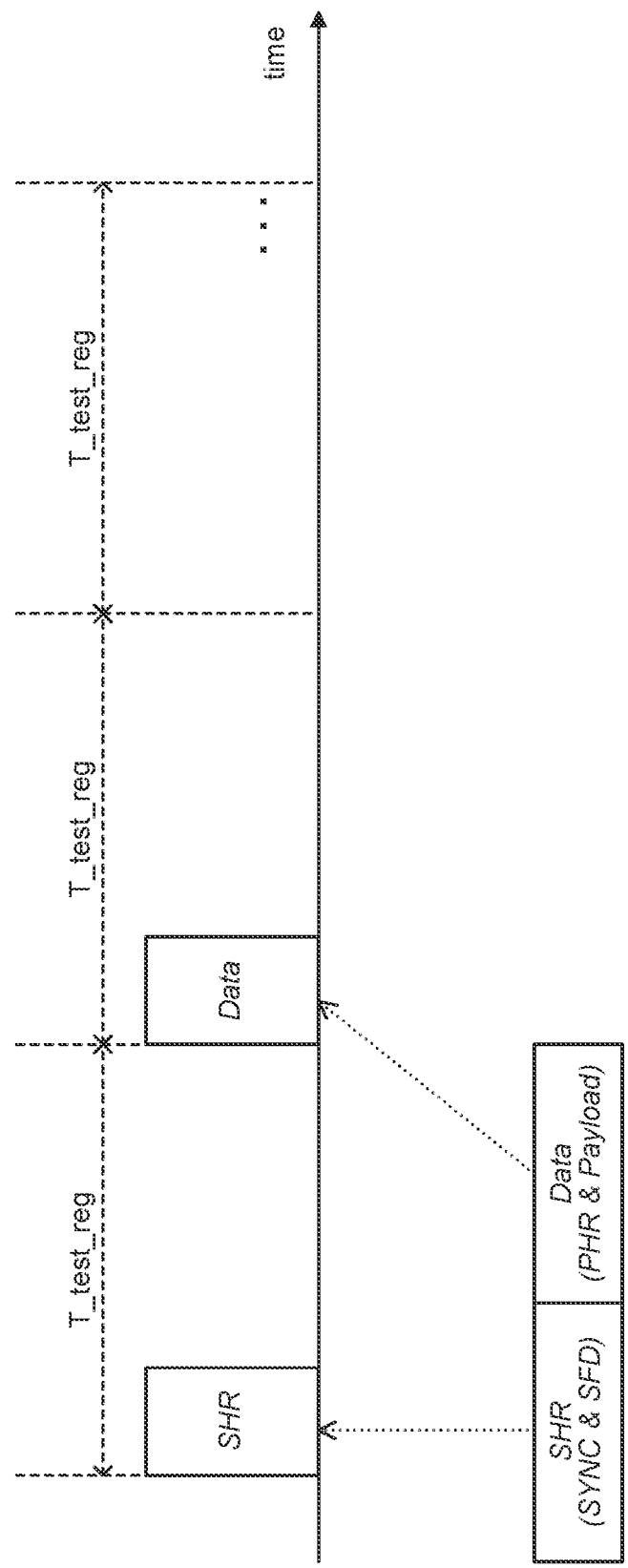
FIGS. 11-22 illustrate specific examples of various frames types being transmitted as a plurality of fragments distributed across one or more regulatory test intervals in different scenarios, according to some embodiments.

FIG. 11 illustrates a 2-fragment example, in which the PHY frame to be transmitted corresponds to TXFA, as illustrated in FIG. 4. In the example of FIG. 11, the two fragments contain a synchronization header (SHR) (including SYNC and SFD) and Data (including PHR and Payload) portions, respectively. A transmitter, such as the wireless device 102, may transmit the SHR, wait at least until one regulatory test interval has passed since the beginning of transmission of the SHR, and then transmit the Data portion of the packet. A receiver, such as the wireless device 104, may receive and operate on the SHR, wait, and then receive the Data portion of the packet. Beneficial RX_PARAMS carried over (stored and restored) from the first to the second fragment on the receive side may include, e.g., state information about AGC, CFO/SFO, precise packet timing, and/or CIR information. It should be noted that, in some scenarios, such as the scenario illustrated, the second fragment may not contain any synchronization or timing fields (such as the SYNC or SFD fields), such that, when receiving the second fragment, the receiver may rely upon the previously transmitted fragment for synchronization, frame acquisition, frame timing, etc. Thus, the separate fragments are not analogous to standalone transmit frames.

Figure 12:
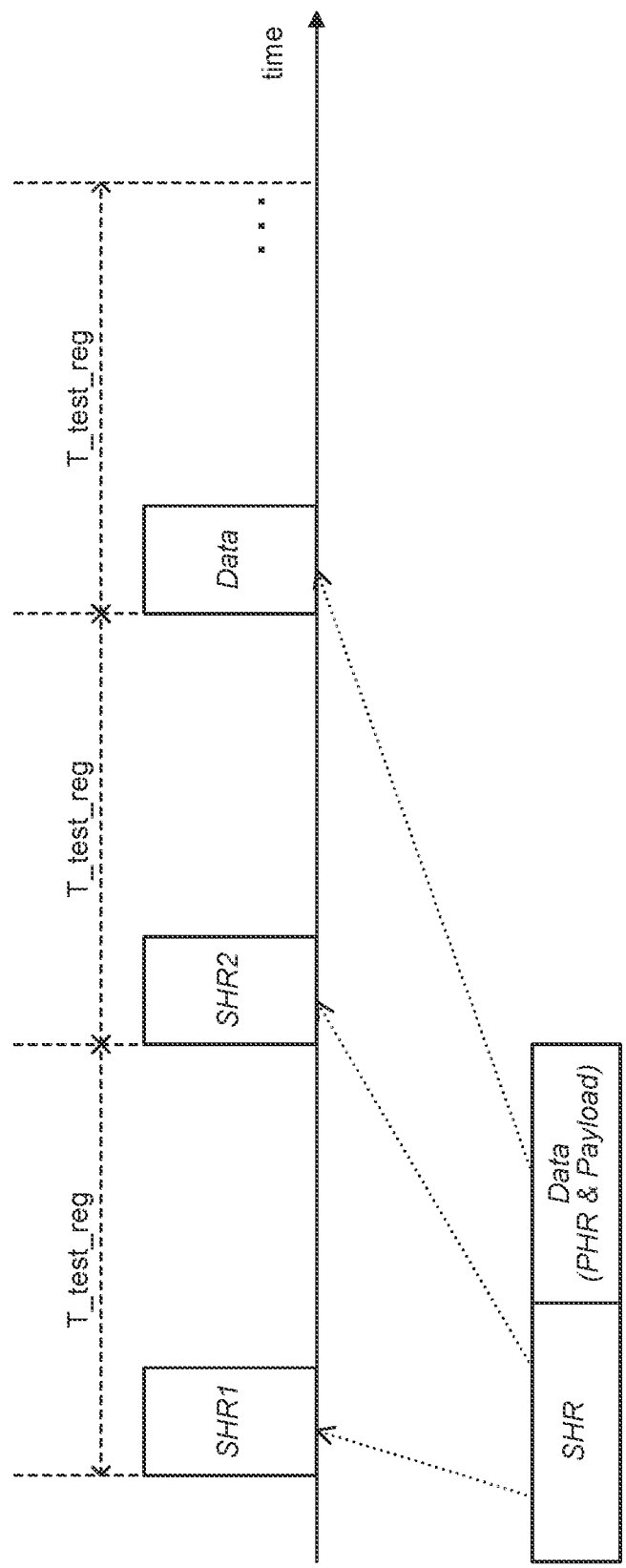

FIG. 12 illustrates a 3-fragment example, in which the PHY frame to be transmitted again corresponds to TXFA, as illustrated in FIG. 4. In the example of FIG. 12, the SHR may be divided across fragment 1 (SHR1) and fragment 2 (SHR2), while the data portion may be transmitted as fragment 3. This may be beneficial because a preliminary packet detection decision may be made while receiving/processing SHR1, which may be confirmed and/or refined while receiving/processing SHR2 using the additional energy contained therein. In some scenarios, the SHR may be fragmented such that SHR1 includes the SYNC, while SHR2 includes the SFD. In some scenarios, the SHR may be divided across SHR1 and SHR2 in some other manner, such as by evenly dividing the time, energy, number of pulses, etc. between the two fragments.

Figure 13:
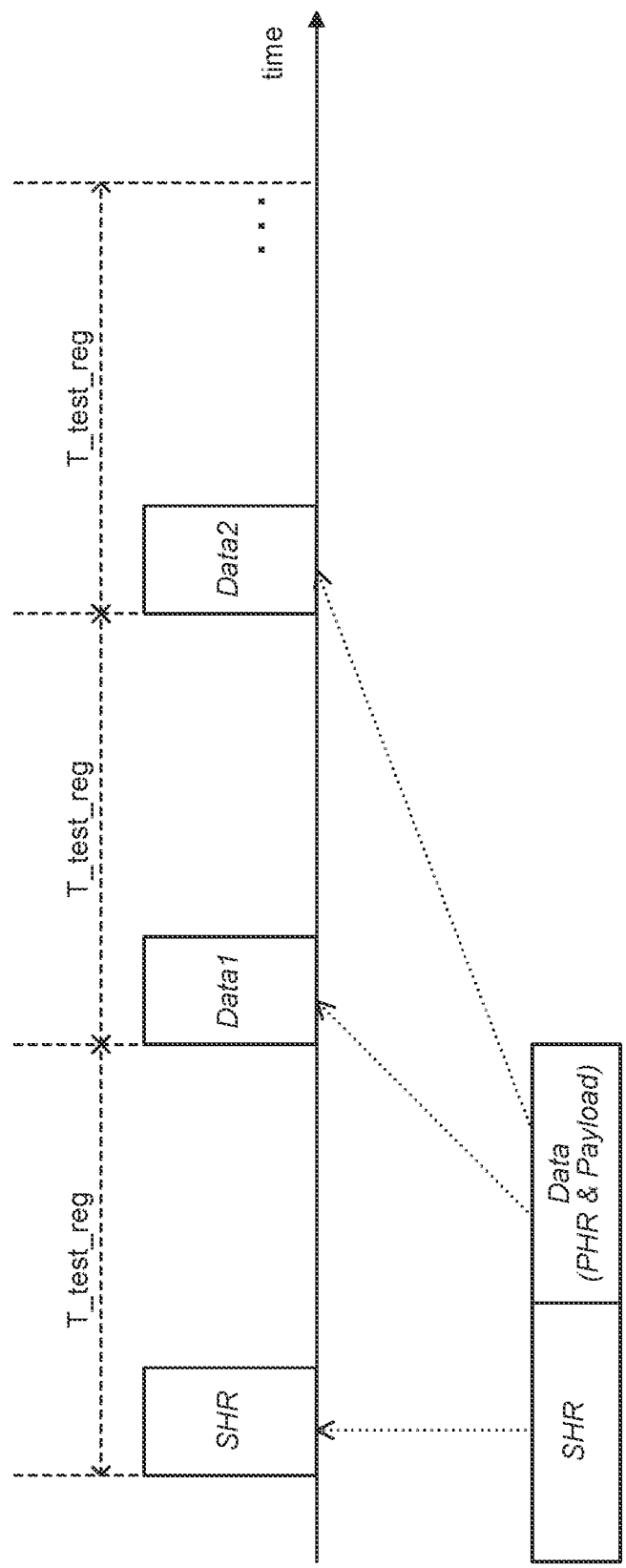

FIG. 13 illustrates a 3-fragment example, in which the PHY frame to be transmitted again corresponds to TXFA, as illustrated in FIG. 4. In the example of FIG. 13, the SHR may be transmitted as fragment 1, while the data portion may be divided across fragment 2 (Data1) and fragment 3 (Data2). In some scenarios, the SHR may be fragmented such that Data1 includes the PHR and a first portion of the payload, while Data2 includes the remainder of the payload. In other scenarios, the data portion of the frame may be divided in some other manner. It should be understood that, in various scenarios, the data portion of the frame may be divided across a larger number of fragments, as appropriate to meet emissions limits. As another example, the examples of FIG. 13 may be combined with the example of FIG. 12, such that the SHR may be divided across a plurality of fragments, and the data portion may also be divided across a plurality of fragments.

Figure 14:
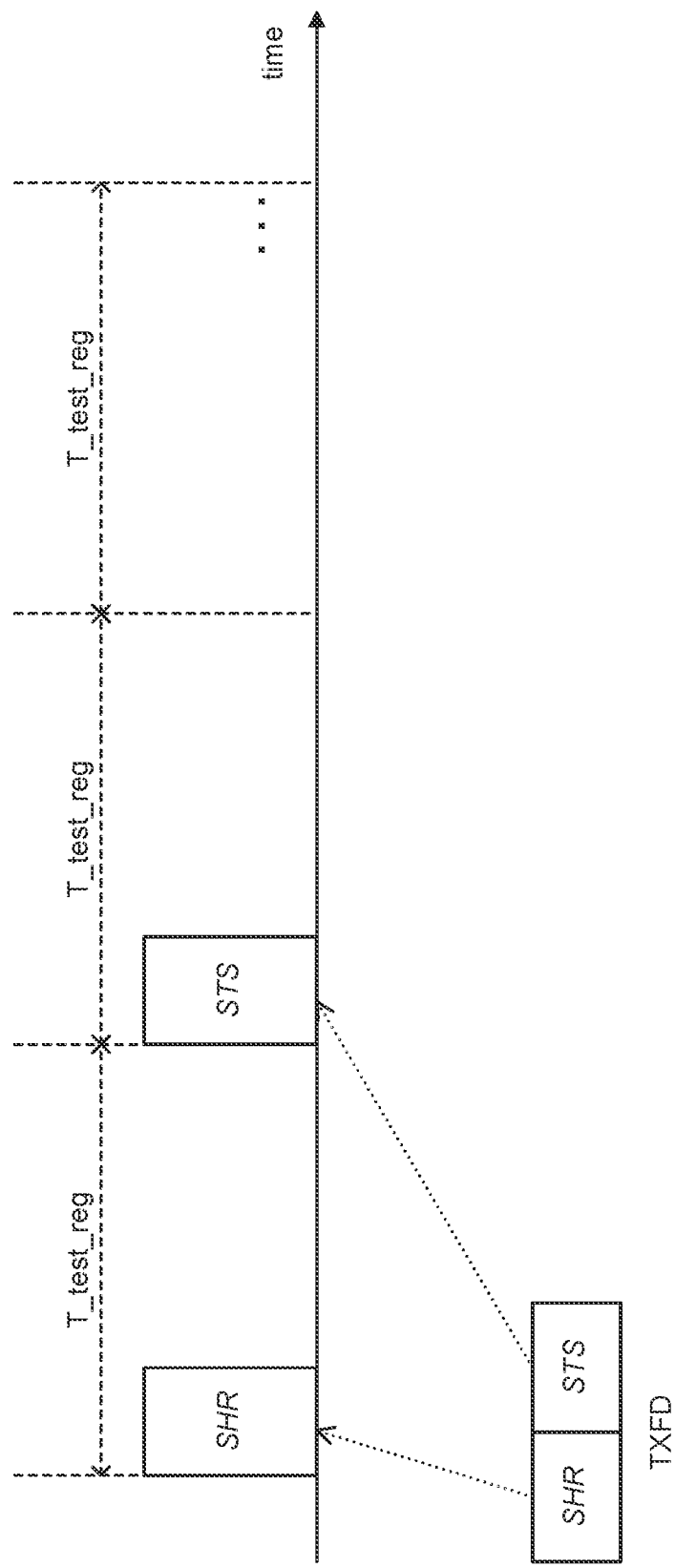

FIG. 14 illustrates a 2-fragment example, in which the PHY frame to be transmitted corresponds to the ND packet format TXFD, as illustrated in FIG. 4. In the example of FIG. 12, the SHR (SYNC and SFD) may be transmitted as fragment 1, while the STS may be transmitted as fragment 2. RX_PARAMS carried forward from one fragment to the next may include AGC information, as well as information on CFO/SFO and packet timing.

Figure 15:
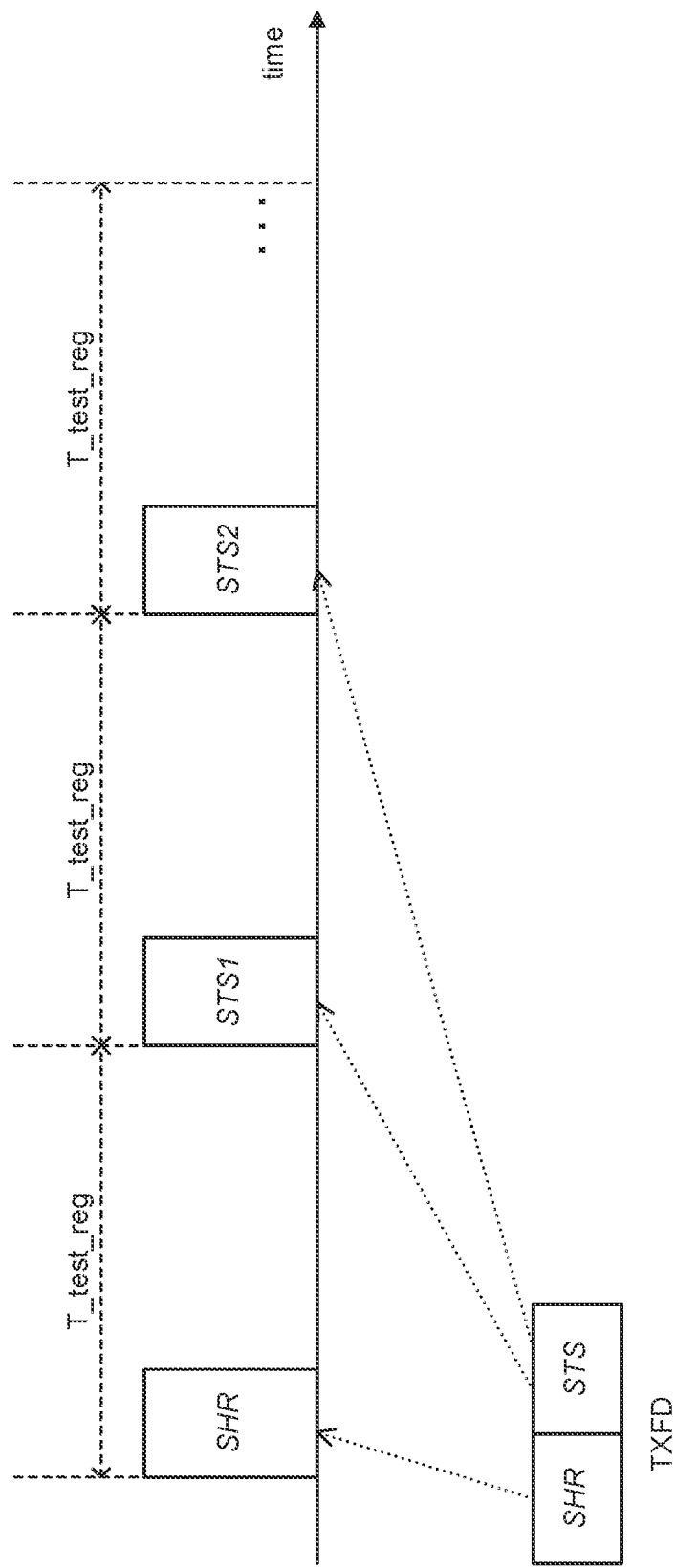

FIG. 15 illustrates a 3-fragment example, in which the PHY frame to be transmitted again corresponds to TXFD, as illustrated in FIG. 4. In the example of FIG. 15, the SHR may be transmitted as fragment 1, while the STS may be divided across fragment 2 (STS1) and fragment 3 (STS2). Alternatively, in the example of FIG. 15, the frame to be transmitted may correspond to TXFE, as illustrated in FIG. 4, wherein the two individually defined STS segments may be transmitted as STS1 and STS2.

Figure 16:
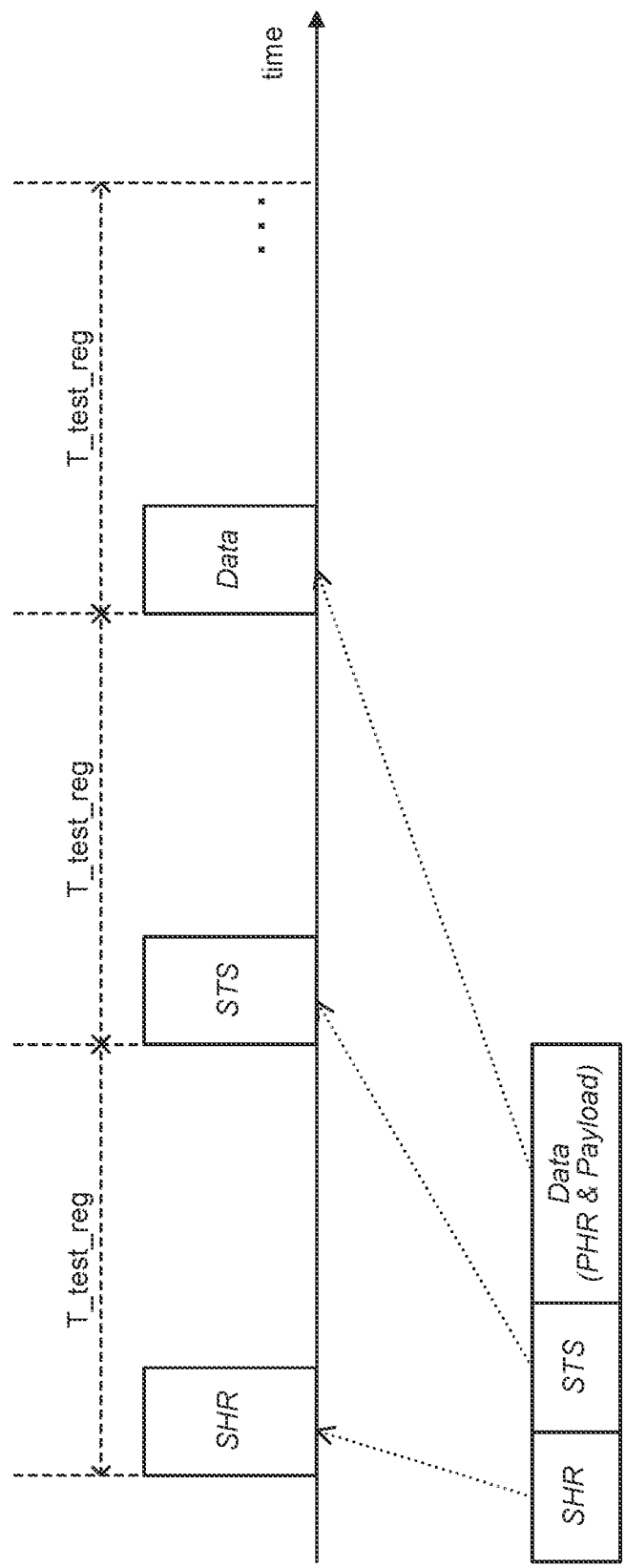

FIG. 16 illustrates a 3-fragment example, in which the PHY frame to be transmitted corresponds to TXFB, as illustrated in FIG. 4. In the example of FIG. 16, the SHR may be transmitted as fragment 1, the STS may be transmitted as fragment 2, and the data portion (PHR and payload) may be transmitted as fragment 3.

Figure 17:
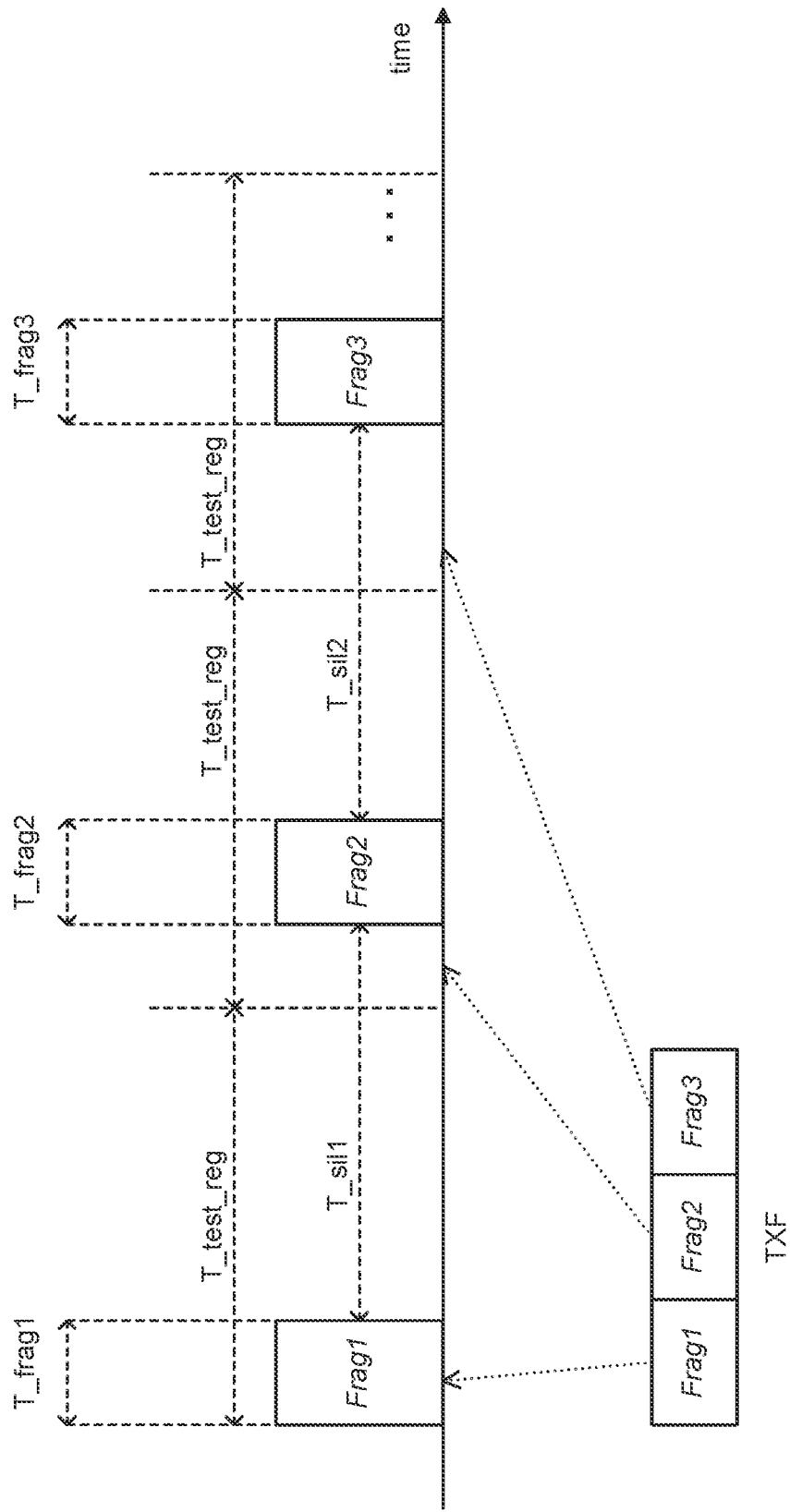

FIG. 17 illustrates an example in which, for each fragment, the sum of the transmission period (T_fragx) and the following silence interval (T_silx) is longer than the regulatory test interval T_test_reg. In some scenarios, the durations of the transmission periods of the fragments (e.g., T_frag1, T_frag2, T_frag3) may differ between each other. Similarly, in some scenarios, the durations of the silence periods between fragments (e.g., T_sil1, T_sil2, T_sil3) may differ between each other. In some scenarios, the silence periods between fragments may exceed multiples of T_test_reg. In some scenarios, the transmitter and the receiver may have a priori knowledge of the silence periods during which the wait activity (with reduced power consumption) is performed. In some scenarios, the durations of the silence periods may be pseudo-random values determined using a procedure known to both the transmitter and the receiver. Using varying silence periods can help with coexistence scenarios in which multiple UWB links operating in a local area may potentially interfere with each other. Varying the silence periods may reduce the chances of repeated collisions. It should be understood that the longer/varied silence intervals illustrated in FIG. 17 may be applied in connection with any of the preceding examples.

Figure 18:
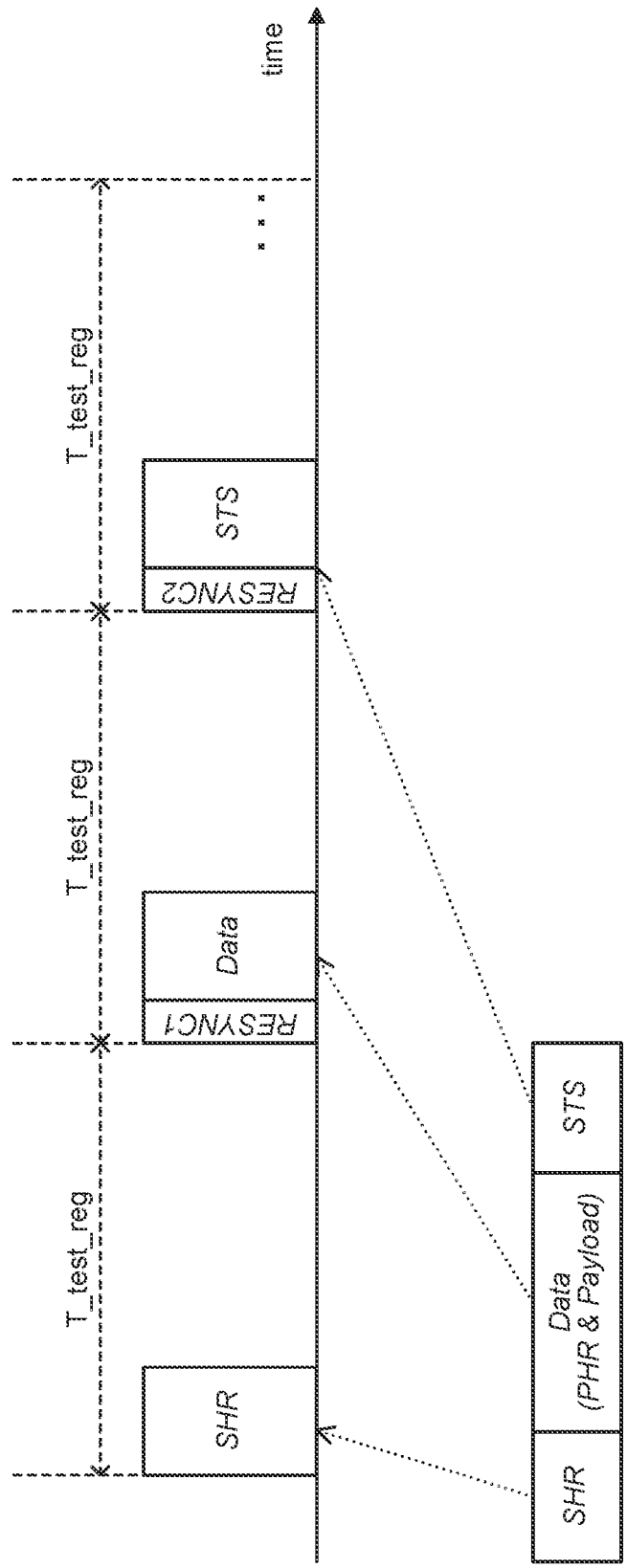

FIG. 18 illustrates a 3-fragment example, in which the PHY frame to be transmitted corresponds to TXFC, as illustrated in FIG. 4. In the example of FIG. 18, the SHR may be transmitted as fragment 1, the data portion may be transmitted as fragment 2, and the STS may be transmitted as fragment 3. In some scenarios, such as the one illustrated in FIG. 18, a brief Resynchronization sequence may be transmitted prior to each of the second and third fragments. These Resynchronization sequences are not contained in the original packet format, but may make it easier for the receiver to process fragments after extended wait times during the silence periods. For instance, if the CFO/SFO estimates from fragment 1 (SHR) are imperfect, the phase estimate predicted for fragment 2 may not be perfect. Therefore, while most of the estimates stored as RX_PARAMS in fragment 1 (such as AGC or CIR estimate) may still be valid, the receiver may benefit from receiving a brief sequence of a-priory known symbols, such as a few periodic or aperiodic SYNC symbols, to obtain the exact carrier phase for receiving the PHR and Payload. It should be understood that insertion of Resynchronization sequences, as illustrated in FIG. 18, may be applied to any of the preceding examples.

Figure 19:
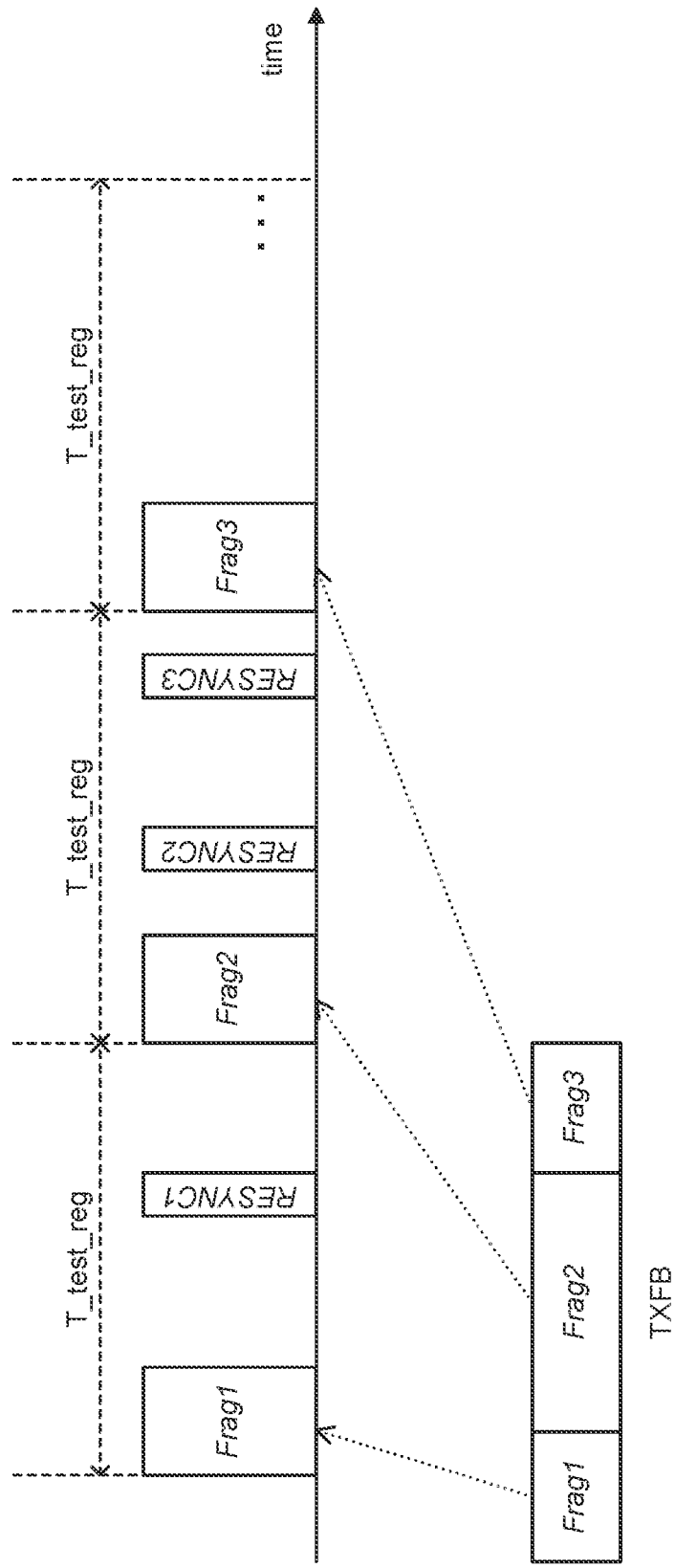

In some scenarios, one or more Resynchronization sequences may be transmitted between fragments at times other than immediately preceding a fragment. FIG. 19 illustrates an example of such a scenario. As illustrated in FIG. 19, a single Resynchronization sequence (RESYNC1) is transmitted between fragment 1 and fragment 2, and two Resynchronization sequences (RESYNC1 AND RESYNC3) are transmitted between fragment 2 and fragment 3. In various scenarios, any appropriate number of Resynchronization sequences may be transmitted at any appropriate time between fragments, to assist in maintaining synchronization between the transmitter and the receiver. It should be understood that insertion of Resynchronization sequences, as illustrated in FIG. 19, may be applied to any of the preceding examples.

Figure 20:
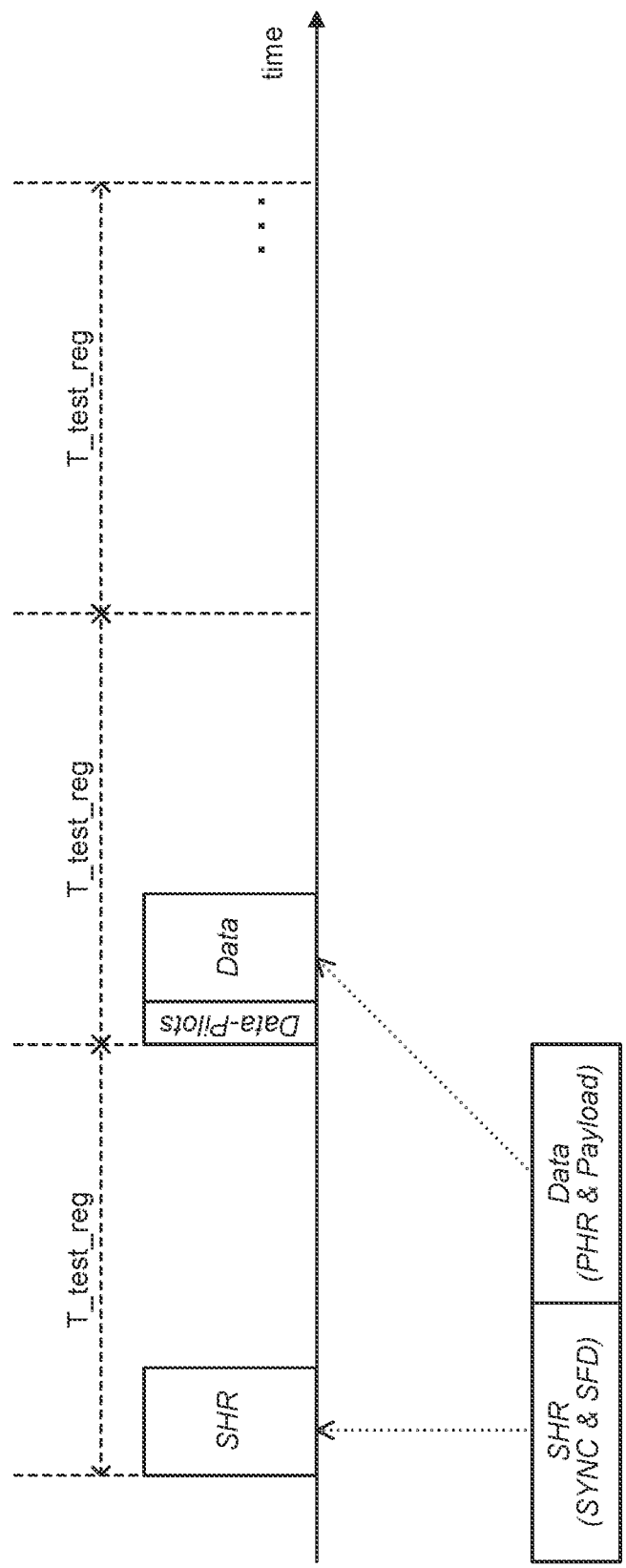

FIG. 20 illustrates a 2-fragment example, in which the PHY frame to be transmitted corresponds to TXFA, as illustrated in FIG. 4. In the example of FIG. 11, the SHR may be transmitted in fragment 1, and the data portion may be transmitted in fragment 2, similar to the example illustrated in FIG. 11. However, in the example of FIG. 20, the transmitter may transmit a data pilots sequence preceding the data portion (e.g., immediately preceding the data portion). The data pilots sequence may include known data symbols to be prepended to the unknown data of the data portion in fragment 2. The data pilots sequence may allow the receiver to refresh CIR estimates and/or phase estimates. While the receiver may still use the RX_PARAMS obtained in fragment 1 (SHR) to support reception of fragment 2, the receiver may use the local information obtained through reception of the data pilots sequence to refresh and enhance this information. As in the case of the Resynchronization sequences, this may help reduce the impact of the information in RX_PARAMS being partly outdated by the time the second segment is received/processed. It should be understood that insertion of a data pilots sequence, as illustrated in FIG. 20, may be applied to any of the preceding examples that include a data portion.

In some scenarios, applicable regulations may define a separate energy budget for each of a plurality of spectrum channels. For example, applicable regulations may limit emissions allowed within a first channel (e.g., the 500 MHz centered around 6.5 GHz), and may independently limit emissions allowed within a second channel (e.g., the 500 MHz centered around 8 GHz). Thus, a transmitter may, within a single regulatory test interval, transmit both the maximum energy allowed on the first channel and the maximum energy allowed on the second channel.

Figure 21:
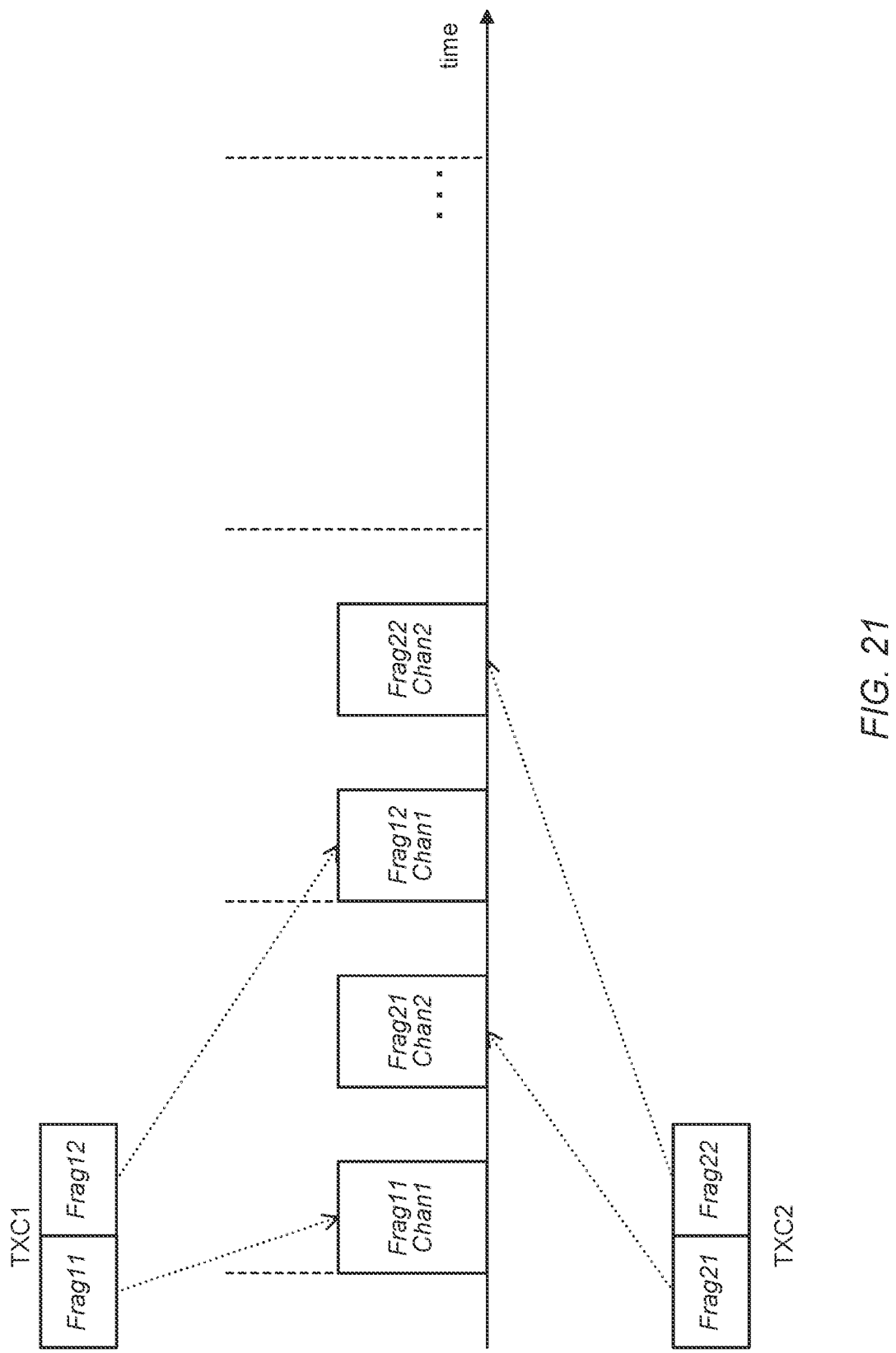

FIG. 21 illustrates an example in which a transmitter transmits a first packet (TXC1) on a first channel or carrier frequency (Chan1), and a second packet (TXC2) on a second channel or carrier frequency (Chan2). In the example of FIG. 21, Chan1 and Chan2 are distinct channels, such as the 500 MHz centered around each of 6.5 GHz and 8 GHz, respectively. In some scenarios, the channels may be non-overlapping.

As illustrated in FIG. 21, the transmitter may divide TXC1 into a plurality of fragments, and may transmit each fragment within a different regulatory test interval, e.g., as illustrated in any of the preceding examples. The transmitter may also divide TXC2 into a plurality of fragments, and may transmit each fragment within a different regulatory test interval, e.g., as illustrated in any of the preceding examples. It should be noted that, within any given regulatory test interval, the transmitter may transmit both a fragment of TXC1 and a fragment of TXC2, because the two packets are operating within different channels, and are therefore subject to independent emissions limits. For example, during the first regulatory test interval, the transmitter may transmit a first fragment of TXC1 (Frag11) through Chan1 and transmit a first fragment of TXC2 (Frag21) through Chan2. During the second regulatory period, the transmitter may transmit a second fragment of TXC1 (Frag12) through Chan1 and transmit a second fragment of TXC2 (Frag22) through Chan2. Thus, the transmitter may make use of the fact that each channel has a certain transmit energy budget E_reg. Therefore, by time-multiplexing as illustrated in FIG. 21, more energy can be transmitted within a given time window, while only using one set of transmit circuitry components.

From a control flow perspective, the wait time for the transmission in Chan1 is utilized to transmit a fragment for Chan2, and vice versa. On the receive side, if the two packets TXC1 and TXC2 are intended for different receiver stations, then the control flow may be identical to that shown in any of the preceding examples. If both channels' transmissions are intended for the same receiver, then the wait period of the reception in Chan1 may be interrupted to serve the fragment reception of Chan2, and vice versa.

Figure 22:
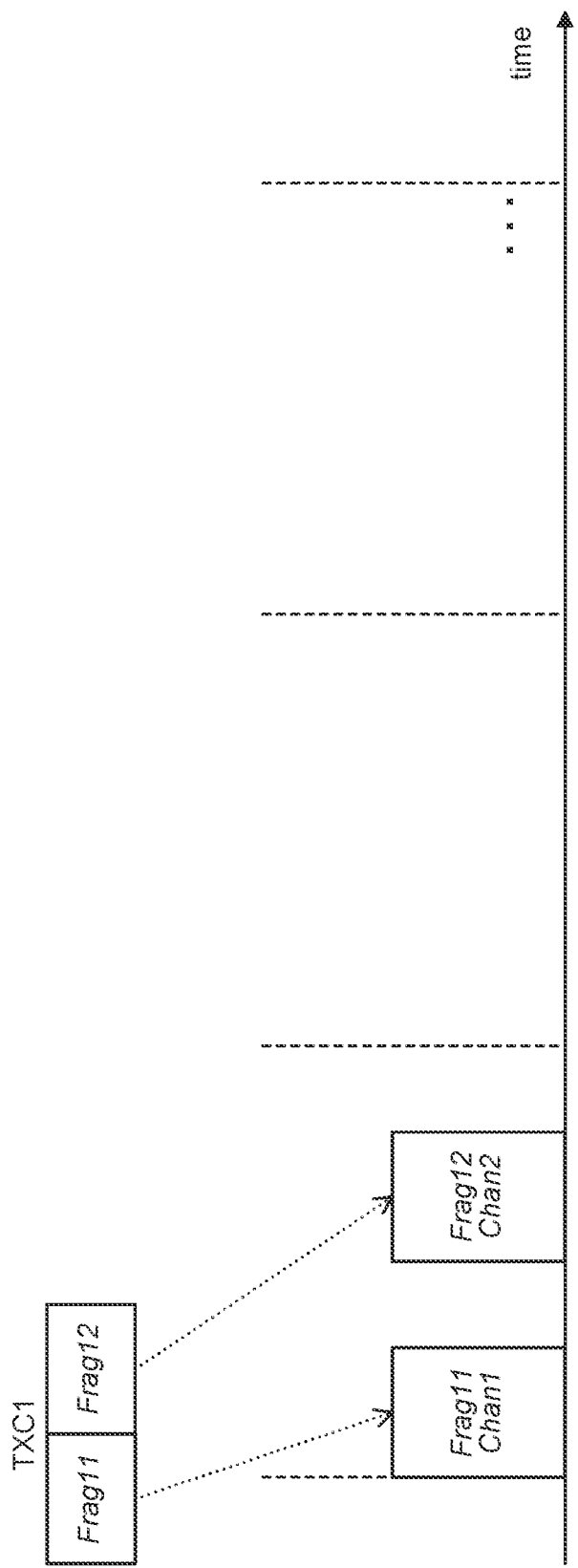

FIG. 22 illustrates another application of this principle, in which a plurality of fragments (Frag11, Frag12) of single packet (TXC1) are transmitted on a corresponding plurality of channels (Chan1, Chan2) within a single regulatory test interval. In this example, a given transmission format is split in both the time and frequency domain. Specifically, Frag11 is transmitted first in Channel 1, and Frag12 is transmitted second, in Channel 2. The transmissions may take place in the same regulatory interval, as each channel has a separate energy budget to exploit.

In other words, the transmitter may divide TXC1 and/or constrain the transmit power levels of one or more fragments of TXC1 such that the total energy emitted for transmission within a regulatory test interval remains within a predetermined energy limit (e.g., the energy limit defined for Chan1), even when the transmitter also emits additional energy (e.g., to transmit another fragment of TXC1 or a fragment of TXC2) on Chan2 during the same regulatory test interval. The predetermined energy limit is still satisfied, because the energy limit defines a limit only for Chan1. A separate (e.g., independent) regulatory energy limit may apply to Chan2, which may be the same as or different than the limit applied to Chan1.

Because the propagation channel (e.g., the effective impulse response or CIR visible to the wireless transmission) may differ between different spectral channels, some fragmentation approaches are better suited than others for splitting between spectral channels. One practical application is to assign the SHR to Frag11 in Channel 1, and STS to Frag12 in Channel 2, as the receiver can estimate a separate CIR from the STS. In some scenarios, the receiver may utilize some of the information RX_PARAMS derived in Frag11 for the reception of Frag12, as per the flow diagram in FIG. 10. For example, a crystal frequency offset (e.g., in parts per million, ppm) obtained during reception of Frag11 may be beneficially reused in receiving Frag12. Because the crystals and their specific frequency offsets can be assumed to be constant across short time intervals, a frequency offset estimated during Frag11 may typically still be applicable during Frag12. Therefore, for the reception of Frag12 (e.g., STS), the receiver may apply a frequency correction according to the offset estimated during Frag11 (e.g., SHR). Many other variations are envisioned. For example, Frag11 may be an SHR, while Frag12 may be a data payload fragment, possibly preceded by a short, known training sequence to re-estimate the channel CIR before detecting and decoding the Data.

Figure 23A:
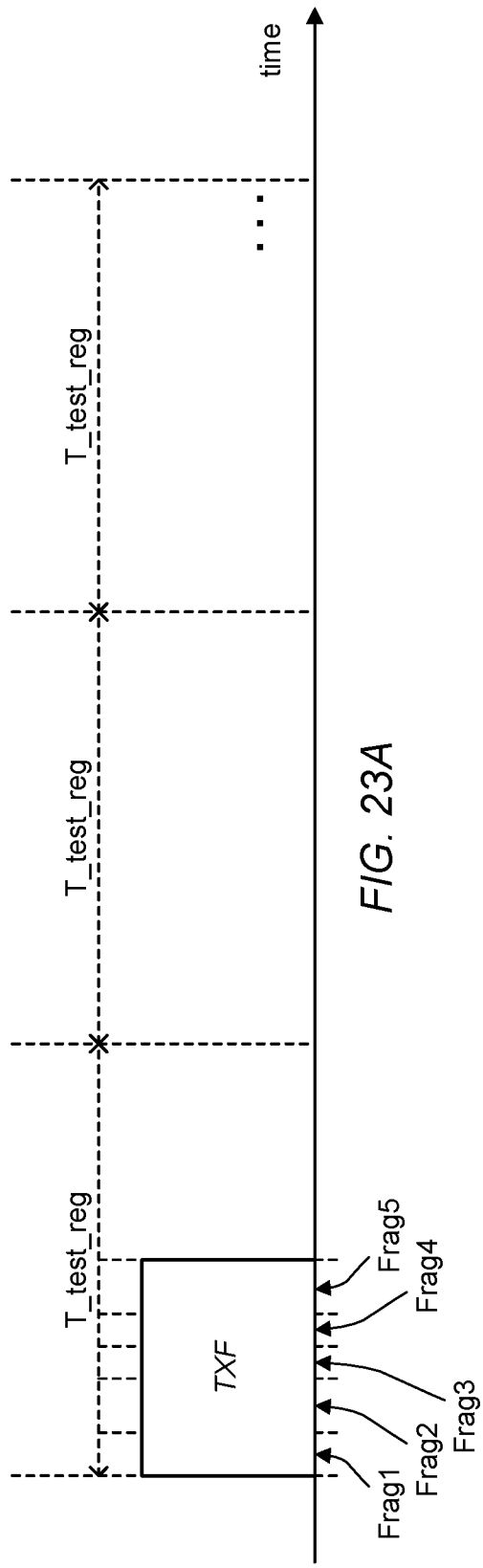
FIGS. 23A and 23B illustrate a generalized example of a frame being transmitted as a plurality of fragments distributed across a plurality of regulatory test intervals, according to some embodiments.

FIG. 23 shows a generalized example, in which a PHY frame may be transmitted as a plurality of fragments distributed across a plurality of regulatory test intervals, according to some embodiments. FIG. 23a illustrates the entire PHY transmit frame (TXF) transmitted as a single fragment. As discussed above, inclusion of the entire frame within a single regulatory test interval may constrain the average transmit power level that may be used, so as to comply with E_reg.

Figure 23B:
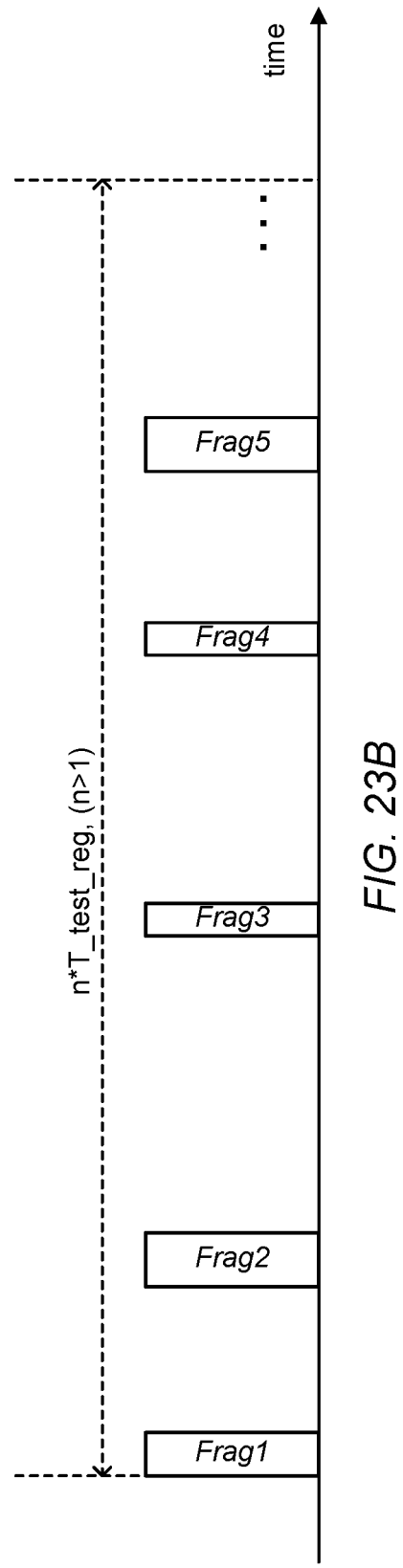

FIG. 23b illustrates the PHY transmit frame divided into a plurality of fragments, similar to the scenario shown in FIG. 8. However, instead of assigning fragments to specific successive regulatory test intervals, as in FIG. 8, FIG. 23b illustrates a generalization of the approach, in which the plurality of fragments (Frag1, Frag2, Frag3, Frag4, and Frag5) are distributed over a plurality of regulatory test intervals according to any suitable timing and form. This general approach further accommodates additional embodiments. For example, in some scenarios, the SYNC field may be split into several short fragments that may be transmitted with silence periods between them, transmitting one or more such fragments within a given regulatory time period. Transmitting multiple short fragments of the SYNC field within a single regulatory time period may help the receiver with acquisition tasks such as phase and/or frequency offset tracking, which may help to avoid large drifts in phase or frequency from fragment to fragment. This specific example is similar to the reinsertion of resynchronization sequences, as illustrated in FIGS. 18 and 19.

It should be noted that any configuration of fragments according to FIG. 23b may still be constrained to comply with E_reg. For example, if multiple fragments are mapped to a given regulatory time interval, the total aggregate of the emissions of these fragments may be constrained to meet any energy/emissions constraints defined by applicable regulatory rules.

The preceding discussion is directed primarily to UWB communications because the methods and concepts discussed are particularly advantageous in connection with UWB systems and communications. However, it should be understood that the methods, systems, apparatuses, concepts, etc., discussed above may be applied to any appropriate radio access technology or frame format. For example, the present disclosure may be applied to any existing or new frame formats having contiguous transmission frames, which may be broken up into short fragments of high transmit power and relatively long inter-fragment silence periods, as disclosed herein. The present disclosure is particularly applicable to frame formats that consist of one or more fields that serve certain functions, such as acquisition, data payload transport, time-of-flight estimation, secure time-of-flight estimation, etc.

Additional Examples

According to an example method, a wireless communication device, such as the wireless device 102 (or some portion thereof, such as the wireless communication circuitry 330) may perform a method of transmitting a physical layer (PHY) communication frame. The wireless device may divide the PHY communication frame into a plurality of fragments for transmission on one or more frequency channels, wherein a predetermined energy limit may define a maximum average transmit power transmitted within each frequency channel within a predefined test interval. The wireless device may transmit each fragment during a separate time-frequency window, such that the average transmit power transmitted within each frequency channel within any time span equal to the predefined test interval remains below the predetermined energy limit.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor configured to:
   structure an ultra-wideband (UWB) physical layer (PHY) communication frame as a plurality of fragments; and
   cause transmission of the fragments during a transmit interval, wherein an average transmit power used to transmit the fragments is constrained such that a total energy emitted during any continuous portion of the transmit interval having a duration of a predefined measurement interval remains within an energy limit corresponding to the predefined measurement interval.

2. The processor of claim 1, wherein causing transmission of the fragments during the transmit interval includes separating each fragment from a respective preceding fragment by a silence period during which no portion of the UWB PHY communication frame is transmitted.

3. The processor of claim 1, wherein a sum of energy emitted during transmission of the UWB PHY communication frame exceeds the energy limit corresponding to the predefined measurement interval.

4. The processor of claim 1, wherein the energy limit is defined by government regulation.

5. The processor of claim 1, wherein the plurality of fragments is transmitted within a first frequency channel, wherein the energy limit pertains only to energy emitted within the first frequency channel, and wherein the processor is further configured to:
   cause transmission, within a second frequency channel, of a fragment of a second PHY communication frame, wherein at least a portion of the plurality of fragments and at least a portion of the fragment of the second PHY communication frame fall within a duration of the predefined measurement interval, and wherein a sum of energy emitted during transmission of the at least a portion of the plurality of fragments and energy emitted during transmission of the at least a portion of the fragment of the second PHY communication frame exceeds the predetermined energy limit.

6. The processor of claim 1, wherein a first fragment of the plurality of fragments comprises a synchronization field and a subsequent fragment of the plurality of fragments does not comprise a synchronization field.

7. The processor of claim 6, wherein the subsequent fragment includes a scrambled timestamp sequence (STS) field.

8. An apparatus comprising:
   processor circuitry configured to:
     structure an ultra-wideband (UWB) communication frame as a plurality of fragments;
     constrain a transmit power associated with each respective fragment of the plurality of fragments such that a total energy associated with transmitting one or more of the fragments during any continuous window of time having a duration of a predefined measurement interval remains within an energy limit associated with the measurement interval; and
     cause transmission of the plurality of fragments according to the constrained transmit power.

9. The apparatus of claim 8, wherein causing transmission of the plurality of fragments comprises separating each fragment from a respective preceding fragment by a silence period during which no portion of the UWB communication frame is transmitted.

10. The apparatus of claim 8, further comprising:
    wireless communication circuitry configured to perform the transmission of the plurality of fragments according to the constrained transmit power.

11. The apparatus of claim 8, wherein structuring the UWB communication frame as a plurality of fragments comprises structuring the fragments based on predefined boundaries between fields of the communication frame.

12. The apparatus of claim 8, wherein the energy limit pertains only to energy emitted within a first frequency channel, wherein at least a first fragment of the plurality of fragments is transmitted within the first frequency channel, and at least a first fragment of a second UWB communication frame is transmitted within a second frequency channel, wherein the first fragment of the plurality of fragments and the first fragment of the second UWB communication frame are transmitted within a single predefined measurement interval, and wherein a total energy emitted by the apparatus for transmission of the first fragment of the plurality of fragments and the first fragment of the second UWB communication frame exceeds the energy limit.

13. The apparatus of claim 8, wherein the energy limit pertains only to energy emitted within a first frequency channel, wherein at least a first fragment of the plurality of fragments is transmitted within the first frequency channel, and at least a second fragment of the plurality of fragments is transmitted within a second frequency channel, wherein the first fragment and the second fragment are transmitted within a single predefined measurement interval, and wherein a total energy emitted by the apparatus for transmission of the first fragment and the second fragment exceeds the energy limit.

14. The apparatus of claim 8, wherein the processor circuitry is further configured to:
provide for transmission a resynchronization sequence between transmitting a first fragment and a second fragment of the plurality of fragments, wherein the resynchronization sequence comprises a known synchronization pattern that was not part of the communication frame before structuring the communication frame as a plurality of fragments.

15. A method comprising:
structuring a physical layer (PHY) communication frame as a plurality of fragments; and
transmitting the plurality of fragments, wherein power associated with transmitting each fragment of the plurality of fragments is constrained such that a total energy emitted in transmitting a portion of the plurality of fragments within any continuous window of time having a duration of a predefined measurement interval remains within a predetermined energy limit associated with the measurement interval.

16. The method of claim 15, wherein transmitting the plurality of fragments comprises separating each fragment from a respective preceding fragment by a silence period during which no portion of the PHY communication frame is transmitted.

17. The method of claim 15, wherein structuring the PHY communication frame as a plurality of fragments comprises structuring the fragments based on predefined boundaries between fields of the PHY communication frame.

18. The method of claim 15, wherein the energy limit pertains only to energy emitted within a first frequency channel, wherein at least a first fragment of the plurality of fragments is transmitted within the first frequency channel, and at least a first fragment of a second PHY communication frame is transmitted within a second frequency channel, wherein the first fragment of the plurality of fragments and the first fragment of the second PHY communication frame are transmitted within a single predefined measurement interval, and wherein a total energy emitted in transmission of the first fragment of the plurality of fragments and the first fragment of the second PHY communication frame exceeds the energy limit.

19. The method of claim 15, wherein the energy limit pertains only to energy emitted within a first frequency channel, wherein at least a first fragment of the plurality of fragments is transmitted within the first frequency channel, and at least a second fragment of the plurality of fragments is transmitted within a second frequency channel, wherein the first fragment and the second fragment are transmitted within a single predefined measurement interval, and wherein a total energy emitted in transmission of the first fragment and the second fragment exceeds the energy limit.

20. The method of claim 15, further comprising:
transmitting a resynchronization sequence between transmitting a first fragment and a second fragment of the plurality of fragments, wherein the resynchronization sequence comprises a known synchronization pattern that was not part of the communication frame before structuring the communication frame as a plurality of fragments.

* * * * *